US009025023B2

(12) United States Patent
Park et al.

(10) Patent No.: US 9,025,023 B2
(45) Date of Patent: *May 5, 2015

(54) METHOD FOR PROCESSING IMAGE DATA IN TELEVISION HAVING MULTIPLE IMAGE SENSORS AND THE TELEVISION FOR CONTROLLING THE SAME

(75) Inventors: Soungsoo Park, Pyeongtaek-si (KR);
Taehyeong Kim, Pyeongtaek-si (KR);
Kyungyoung Lim, Pyeongtaek-si (KR);
Sangki Kim, Pyeongtaek-si (KR);
Mingoo Kang, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 324 days.

This patent is subject to a terminal disclaimer.

(21) Appl. No.: 13/028,958

(22) Filed: Feb. 16, 2011

(65) Prior Publication Data
US 2012/0120271 A1    May 17, 2012

(30) Foreign Application Priority Data

Nov. 11, 2010   (KR) .................. 10-2010-0111952
Nov. 11, 2010   (KR) .................. 10-2010-0111954

(51) Int. Cl.
*H04N 7/18*      (2006.01)
*G06K 9/00*      (2006.01)
*H04N 7/16*      (2011.01)

(52) U.S. Cl.
CPC ........ *G06K 9/00597* (2013.01); *G06K 9/00221* (2013.01)

(58) Field of Classification Search
USPC ................. 348/135–143, 153, 159, 211.9, 348/211.11–211.14, 161; 382/115–127; 725/9–12
See application file for complete search history.

(56) References Cited

U.S. PATENT DOCUMENTS

| 5,164,992 | A | 11/1992 | Turk et al. | |
|---|---|---|---|---|
| 6,181,271 | B1 * | 1/2001 | Hosaka et al. | 342/33 |
| 7,181,689 | B2 * | 2/2007 | Mock et al. | 715/703 |
| 8,055,029 | B2 * | 11/2011 | Petrescu et al. | 382/118 |
| 8,787,627 | B1 * | 7/2014 | Freedman | 382/115 |
| 2002/0091937 | A1 * | 7/2002 | Ortiz | 713/200 |

(Continued)

FOREIGN PATENT DOCUMENTS

| CN | 1442812 A | 9/2003 |
|---|---|---|
| GB | 2 447 246 A | 9/2008 |

(Continued)

OTHER PUBLICATIONS

Scott Stillman: "A system for tracking and recognizing multiple people with multiple cameras", Technical Report GIT-GVU-93-12, Dec. 1, 1998, pp. 1-6, XP009097239.

(Continued)

*Primary Examiner* — Chia-Wei A Chen
(74) *Attorney, Agent, or Firm* — KED & Associates LLP

(57) ABSTRACT

A multimedia device includes a first image sensor to acquire a first image, a second image sensor to acquire a second image, and a processor to determine coordinate information of the person in the first image and to extract a feature of the person in the second image based on the coordinate information. The first and second image sensors have overlapping fields of view, the coordinate information provides an indication of a distance to the person, and the processor compares the extracted feature to reference information and recognizes the person based on the comparison.

6 Claims, 35 Drawing Sheets

(56) References Cited

U.S. PATENT DOCUMENTS

| | | | |
|---|---|---|---|
| 2003/0167464 A1* | 9/2003 | Meyer | 725/10 |
| 2004/0109063 A1* | 6/2004 | Kusaka et al. | 348/207.1 |
| 2004/0125142 A1* | 7/2004 | Mock et al. | 345/765 |
| 2004/0190776 A1* | 9/2004 | Higaki et al. | 382/190 |
| 2004/0194133 A1* | 9/2004 | Ikeda et al. | 725/37 |
| 2004/0263625 A1* | 12/2004 | Ishigami et al. | 348/152 |
| 2005/0060750 A1* | 3/2005 | Oka et al. | 725/80 |
| 2005/0180611 A1* | 8/2005 | Oohashi et al. | 382/118 |
| 2005/0234828 A1* | 10/2005 | Matsuyama et al. | 705/51 |
| 2005/0271279 A1* | 12/2005 | Fujimura et al. | 382/203 |
| 2006/0028548 A1* | 2/2006 | Salivar et al. | 348/143 |
| 2006/0209181 A1* | 9/2006 | Van Geest | 348/14.08 |
| 2007/0126884 A1* | 6/2007 | Xu et al. | 348/220.1 |
| 2007/0268121 A1* | 11/2007 | Vasefi et al. | 340/506 |
| 2008/0037839 A1* | 2/2008 | Corcoran et al. | 382/118 |
| 2008/0216140 A1* | 9/2008 | Liwerant et al. | 725/113 |
| 2008/0279425 A1* | 11/2008 | Tang | 382/118 |
| 2008/0307475 A1* | 12/2008 | Liwerant et al. | 725/109 |
| 2008/0319852 A1* | 12/2008 | Gardner et al. | 705/14 |
| 2009/0023472 A1* | 1/2009 | Yoo et al. | 455/556.1 |
| 2009/0116703 A1* | 5/2009 | Schultz | 382/118 |
| 2009/0122161 A1* | 5/2009 | Bolkhovitinov | 348/234 |
| 2009/0210898 A1* | 8/2009 | Childress et al. | 725/34 |
| 2009/0228841 A1* | 9/2009 | Hildreth | 715/863 |
| 2009/0248703 A1* | 10/2009 | Tsukagoshi et al. | 707/10 |
| 2010/0013917 A1* | 1/2010 | Hanna et al. | 348/143 |
| 2010/0039378 A1* | 2/2010 | Yabe et al. | 345/156 |
| 2010/0060743 A1* | 3/2010 | Sato | 348/207.1 |
| 2010/0067750 A1* | 3/2010 | Matsuo et al. | 382/118 |
| 2010/0141767 A1* | 6/2010 | Mohanty et al. | 348/159 |
| 2010/0303289 A1* | 12/2010 | Polzin et al. | 382/103 |
| 2010/0321473 A1* | 12/2010 | An | 348/47 |
| 2011/0150300 A1* | 6/2011 | Lee et al. | 382/118 |
| 2011/0154385 A1* | 6/2011 | Price et al. | 725/12 |
| 2011/0261205 A1* | 10/2011 | Sun | 348/159 |
| 2011/0298918 A1* | 12/2011 | McEldowney | 348/136 |
| 2012/0056800 A1* | 3/2012 | Williams et al. | 345/156 |
| 2012/0114194 A1* | 5/2012 | Kim et al. | 382/115 |
| 2012/0150614 A1* | 6/2012 | Dion et al. | 705/14.32 |
| 2012/0167124 A1* | 6/2012 | Abdeljaoued | 725/11 |
| 2013/0002716 A1* | 1/2013 | Walker et al. | 345/629 |
| 2013/0133005 A1* | 5/2013 | Sakai et al. | 725/46 |
| 2013/0329955 A1* | 12/2013 | Steinberg et al. | 382/103 |
| 2013/0329966 A1* | 12/2013 | Hildreth, Evan | 382/115 |

FOREIGN PATENT DOCUMENTS

| | | |
|---|---|---|
| KR | 10-2006-0035198 | 4/2006 |
| KR | 2007-0066574 | 6/2007 |
| WO | WO 2009/036103 | 3/2009 |

OTHER PUBLICATIONS

Godil A et al: "Human identification from body shape", 3-D Digital Imaging and Modeling, 2003, 3DIM 2003. Proceedings. Forth International Conference on Oct. 6-10, 2003, Piscataway, NJ, USA, IEEE, Oct. 6, 2003, pp. 386-392, XP010662718.

Tsalakanidou F., Malassiotis S. and Strintzis M.G. "Face Localization and Authentication Using Color and Depth Images", IEEE Transactions on Image Pocessing, IEEE Service Center, Piscataway, NJ, US, vol. 14, No. 2, Feb. 1, 2005, 152-168 pages, XP011124977.

Bowyer et al: "A survey of approaches and challenges in 3D and multi-modal 3D+2D face recognition", Computer Vision and Image Understanding, Academic Press, US, vol. 101, No. 1, Jan. 1, 2006, pp. 1-15, XP005176394.

Sowon Yoon et al: "Non-intrusive Iris Image Capturing System Using Light Stripe Projection and Pan-TILT-Zoom Camera", Computer Vision and Pattern Recognition, 2007. CVPR '07. IEEE Conference on, IEEE, Piscatawa, NJ, USA, Jun. 1, 2007, pp. 1-7, XP031114609.

Wheeler F W et al: "Face recognition at the distance system for surveillance applications", BTAS, 2010 Fourth IEEE International Conference on, IEEE, Piscataway, NJ, USA, Sep. 27, 2010, pp. 1-8, XP031800547.

European Search Report dated Apr. 12, 2011.

Chinese Office Action dated Nov. 6, 2013 issued in Application No. 201110082644.6 (with English translation).

* cited by examiner

FIG. 5

| father | face vector1 |
|---|---|
| mother | face vector2 |
| son | face vector3 |
| daughter | face vector4 |
| ⋮ | |
| USER N | face vectorN |

< Color Image >

FIG. 24
< Depth Image >
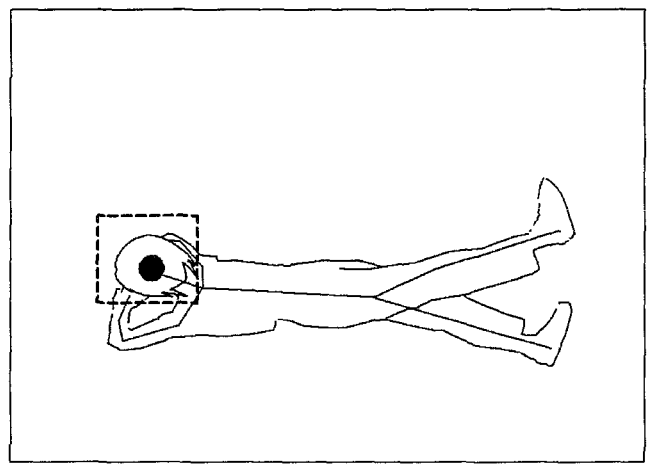
< Color Image >
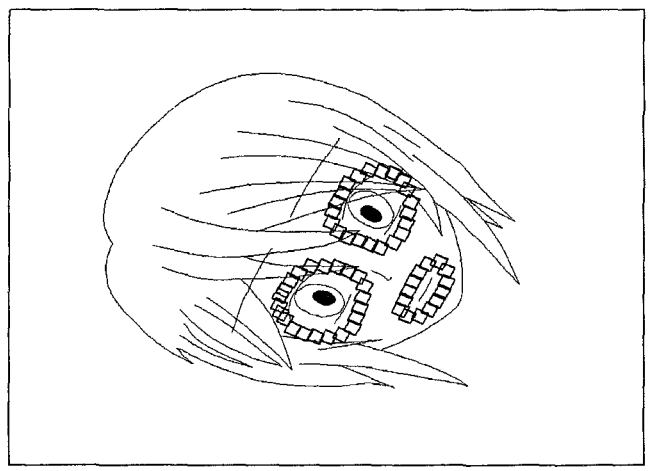

FIG. 25
< Depth Image >
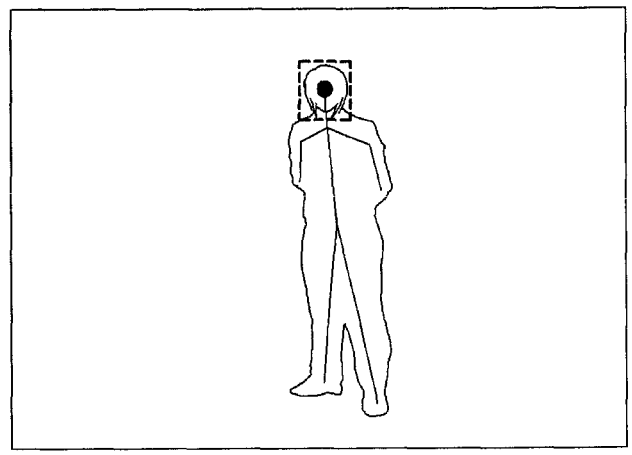
< Color Image >
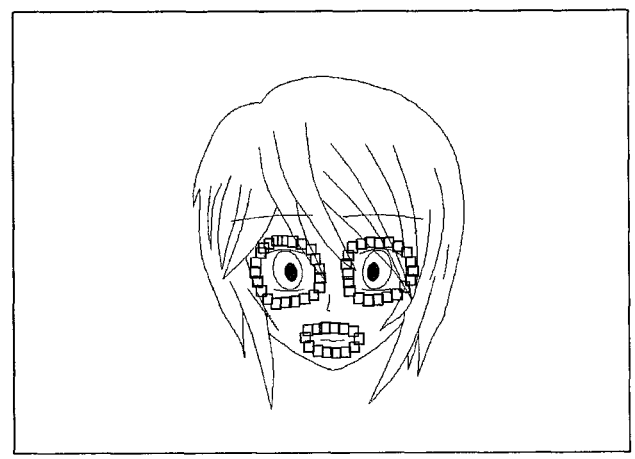

FIG. 26
< Depth Image >
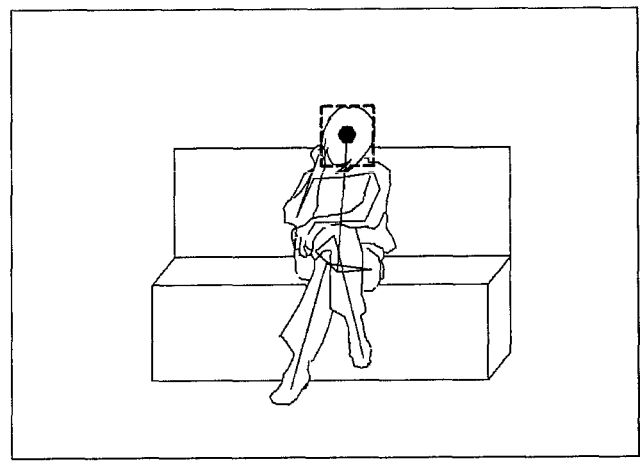
< Color Image >
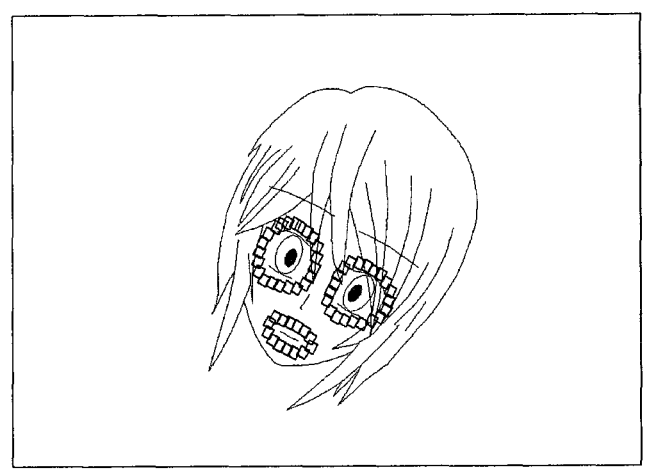

FIG. 27

| pose \ user information | father | mother | son 1 | son 2 | ... |
|---|---|---|---|---|---|
| -15 | a | e | i | m | ... |
| -30 | b | f | j | n | ... |
| +15 | c | g | k | o | ... |
| +30 | d | h | l | p | ... |
| ⋮ | ⋮ | ⋮ | ⋮ | ⋮ | |

< Depth Image >

< Depth Image >

< Depth Image >

< Depth Image >

FIG. 32

| user<br>body information | father | mother | son 1 | son 2 | ... |
|---|---|---|---|---|---|
| arm's length | 70 cm | 60 cm | 40 cm | 30 cm | ... |
| Width of shoulders | 65 cm | 40 cm | 30 cm | 20 cm | ... |
| Height | 170 cm | 160 cm | 145 cm | 120 cm | ... |
| Face size | 28 cm | 25 cm | 20 cm | 15 cm | ... |
| ⋮ | ⋮ | ⋮ | ⋮ | ⋮ | |

METHOD FOR PROCESSING IMAGE DATA IN TELEVISION HAVING MULTIPLE IMAGE SENSORS AND THE TELEVISION FOR CONTROLLING THE SAME

CROSS-REFERENCE TO RELATED APPLICATIONS

This application claims the benefit of the Korean Patent Application No. 10-2010-0111952, filed on Nov. 11, 2010, and 10-2010-0111954, filed on Nov. 11, 2010, the contents of which is incorporated herein by reference.

BACKGROUND

1. Field

One or more embodiments described herein relate to a display device.

2. Background

A variety of display devices have been proposed in order to meet consumer demand and provide new products and services. These devices include high-definition televisions, computer monitors and mobile terminals and as well as a myriad of others. In spite of their commercial success, many improvements are needed.

BRIEF DESCRIPTION OF THE DRAWINGS

FIG. 5 shows a list of face vectors stored in a database.

FIG. 24 shows scenes where a depth image and a color image based on a first pose of a user are taken by a plurality of heterogeneous image sensors.

FIG. 25 shows scenes where a depth image and a color image based on a second pose of a user are taken by a plurality of heterogeneous image sensors.

FIG. 26 shows scenes where a depth image and a color image based on a third pose of a user are taken by a plurality of heterogeneous image sensors.

FIG. 27 shows a database that stores feature information of each user according to pose information, generated based on scenes in FIG. 24 to FIG. 26.

FIG. 32 shows a database that stores body information of a plurality of users generated based on scenes taken in FIG. 28 to FIG. 31.

DETAILED DESCRIPTION

Figure 1:
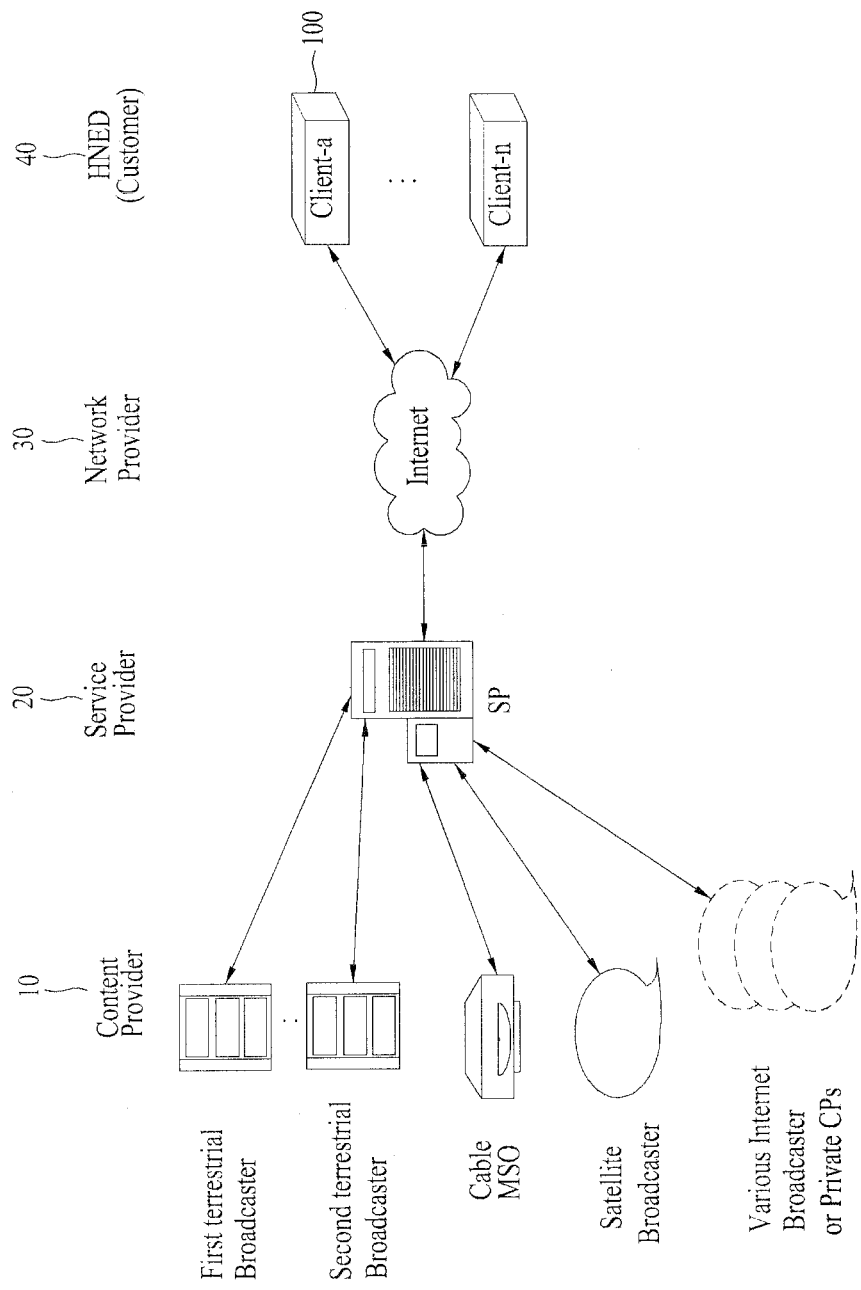
FIG. 1 shows one embodiment of a multimedia system.

FIG. 1 shows one embodiment of a multimedia system including a multimedia device in the form of a connected TV. The system includes a content provider (CP) 10, a service provider (SP) 20, a network provider (NP) 30, and a home network end user (FINED) 40. The HNED 40 corresponds to, for example, a client 100 which is the multimedia device.

The content provider 10 manufactures various contents and provides them. Examples of the content provider 10 include a terrestrial broadcaster, a cable system operator (SO), a multiple system operator (MSO), a satellite broadcaster, and an Internet broadcaster, as illustrated in FIG. 1. Also, the content provider 10 may provide various applications in addition to broadcast contents.

The service provider 20 can provide contents provided by the content provider 10 by service-packaging them. For example, the service provider 20 of FIG. 1 can package first terrestrial broadcasting, second terrestrial broadcasting, cable MSO, satellite broadcasting, various kinds of Internet broadcasting, application, etc. and provide the packaged one to a user.

The network provider 30 may provide a network for providing a service to the client 100. The client 100 may construct a home network end user (HNED) to receive a service.

The client 100 may provide contents through the network. In this case, the client 100 may be a content provider contrary to the above. The content provider 10 may receive contents from the client 100. In this case, it is advantageous in that bidirectional content service or data service is available.

Figure 2:
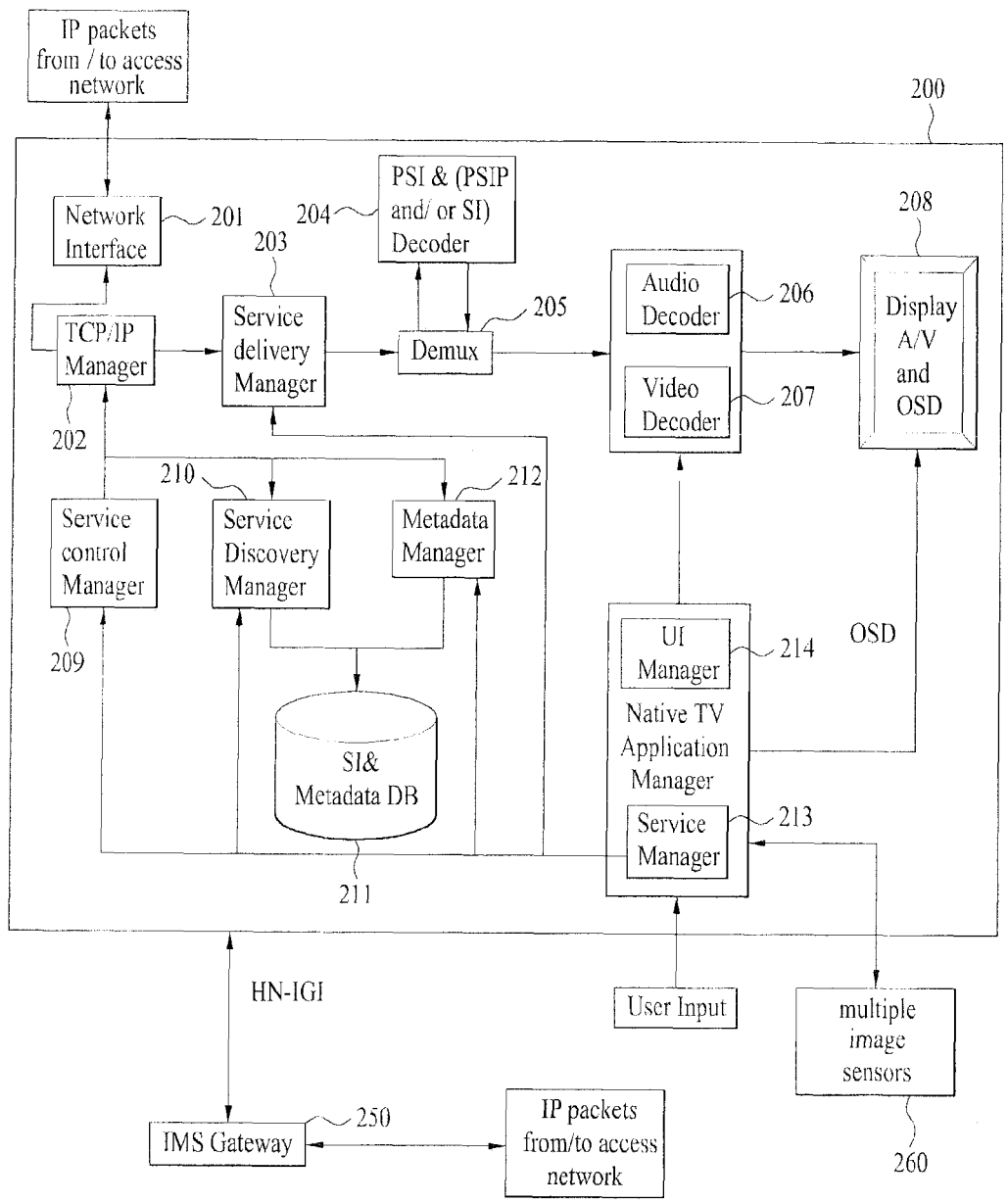
FIG. 2 shows an example of a multimedia device in the system.

FIG. 2 shows an example of a multimedia device which includes a network interface 201, a TCP/IP manager 202, a service delivery manager 203, a demultiplexer (Demux) 205, a PSI& (PSIP and/or SI) decoder 204, an audio decoder 206, a video decoder 207, a display A/V and OSD module 208, a service control manager 209, a service discovery manager 210, a metadata manager 212, an SI&Metadata DB 211, a UI manager 214, and a service manager 213.

Moreover, a plurality of heterogeneous image sensors 260 are connected with the multimedia device 200, by a connection mode of a USB mode, for example. Also, although the plurality of heterogeneous image sensors 260 are designed as separate modules in FIG. 2, the plurality of heterogeneous images sensors 260 may be designed in such a manner that they are housed in the multimedia device 200.

The network interface 201 receives packets from a network, and transmits the packets to the network. In other words, the network interface 201 receives services, contents, etc. from the service provider through the network.

The TCP/IP manager 202 is involved in packets received in the multimedia device 200 and packets transmitted from the multimedia device 200, i.e., packet transfer from the source to the destination. The service delivery manager 203 takes the role of control of received service data. For example, if the service delivery manager 203 controls real-time streaming data, it can use RTP/RTCP. If the service delivery manager 203 transmits the real time streaming data by using RTP, it parses the received packets in accordance with RTP and transmits the parsed packets to the demultiplexer 205 or stores the parsed packets in the SI&Metadata DB 211 under the control of the service manager 213. The service delivery manager 203 feeds the received information back to a server, which provides a service, by using RTCP.

The demultiplexer 205 demultiplexes the received packets to audio, video and PSI (Program Specific information) data and then transmits the demultiplexed data to the audio decoder 206, the video decoder 207, and the PSI&(PSIP and/or SI) decoder 204, respectively.

The PSI& (PSIP and/or SI) decoder 204 receives and decodes PSI section, PSIP (Program and Service information Protocol) section or SI (Service Information) section, which is demultiplexed by the demultiplexer 205.

Also, the PSI&(PSIP and/or SI) decoder 204 decodes the received sections to make a database for service information, and stores the database for service information in the SI&Metadata DB 211.

The audio/video decoders 206/207 decode the video data and the audio data, which are received from the demultiplexer 205.

The UI manager 214 provides a graphic user interface (GUI) for the user by using an on screen display (OSD), etc. and performs a receiving operation based on a key input from the user. For example, if a key input signal for channel selection is input from the user, the UI manager 214 transmits the key input signal to the service manager 213.

The service manager 213 controls managers related to the service, such as the service delivery manager 203, the service discovery manager 210, the service control manager 209, and the metadata manager 212.

Also, the service manager 213 makes a channel map and selects a channel by using the channel map in accordance with the key input signal received from the UI manager 214. The service discovery manager 210 provides information required to select the service provider that provides services. If a signal related to channel selection is received from the service manager 213, the service discovery manager 210 discovers a corresponding service by using the received information.

The service control manager 209 takes the role of selection and control of the service. For example, if the user selects a live broadcasting service like the existing broadcasting mode, the service control manager 209 uses IGMP or RTSP. If the user selects a video on demand (VOD) service, the service control manager 209 selects and controls the service by using RTSP. The metadata manager 212 manages metadata related to the service and stores the metadata in the SI&Metadata DB 211.

The SI&Metadata DB 211 stores the service information decoded by the PSI& (PSIP and/or SI) decoder 204, the metadata managed by the metadata manager 212, and the information required to select the service provider provided by the service discovery manager 210. Also, the SI&Metadata DB 211 may store setup data for the system.

The IG 250 is a gateway where functions required to access IMS based IPTV services are collected.

The plurality of heterogeneous image sensors 260 illustrated in FIG. 2 are designed to take a single image or a plurality of images of a person or object located in the periphery of the multimedia device 200. In more detail, the plurality of heterogeneous image sensors 260 are designed to operate the single image or the plurality of images continuously, periodically, at a selected time, or at a specific condition only, as described later in more detail.

Figure 3:
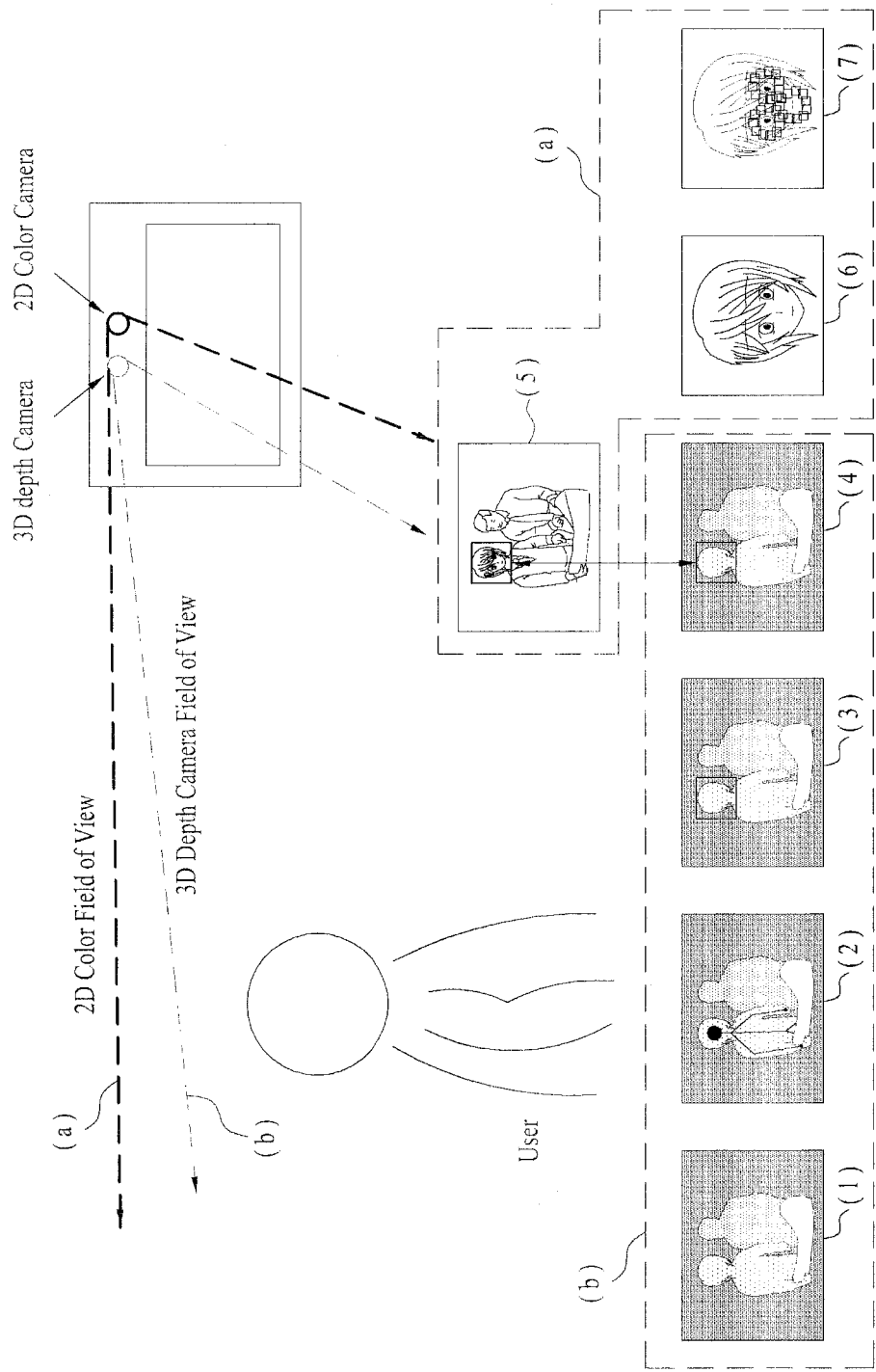
FIG. 3 shows a multimedia device using a plurality of heterogeneous images sensors and camera-taking screens.

FIG. 3 shows one embodiment of a multimedia device based on a plurality of heterogeneous images sensors and camera-taking screens. The sensors include one or more first image sensors related to depth data processing include a field not suitable for long-distance face recognition due to limited resolution (for example, maximum VGA level) and a recognition distance (for example, 3.5 m).

The sensors also include one or more second image sensors related to color data processing have drawbacks in that they have a slow recognition speed and are not robust to light condition. Accordingly, in order to solve the drawbacks of the image sensors, the multimedia device is designed to interact with a hybrid type image sensor module that is a hybrid type of the first image sensor and the second image sensor.

An IR camera or depth camera is used as the first image sensor. In more detail, a time of flight (TOF) type IR camera or depth camera and a structured light type IR camera or depth camera have been discussed. The TOF type IR camera or depth camera calculates distance information by using the time difference resulting from emission of infrared rays. The structured light type IR camera or depth camera calculates distance information by emitting infrared rays to a specific pattern and analyzing a modified pattern. The first image sensor is advantageous in view of depth data recognition and processing speed, and easily senses object, person, etc. even at a dark place. However, the first image sensor has a drawback in that it has low resolution at a long distance.

Moreover, a color camera or RGB camera is used as the second image sensor. In more detail, a stereo camera type color camera or RGB camera and a mono camera type color camera or RGB camera have been discussed. The stereo camera type color camera or RGB camera detects and traces the hand or face based on image time comparison information taken through two cameras. The mono camera type color camera or RGB camera detects and traces the hand or face based on shape and color information taken through one camera. The second image sensor is advantageous in that it has more improved resolution than that of the first image sensor, whereas the second image sensor has drawbacks in that it is vulnerable to peripheral lighting and it is difficult to recognize the corresponding object at a dark place. In particular, the second image sensor has a drawback in that it is difficult to recognize exact depth.

As illustrated in FIG. 3, the multimedia device is designed to have both the first image sensor and the second image sensor. The image sensors may be designed in such a manner that they are embedded in the multimedia device, or may be designed as separate hardware modules. First of all, as illustrated in (b) of FIG. 3, the first image sensor takes images that include users located in the periphery of the multimedia device. Detailed taking-images are illustrated in (1), (2), (3) and (4) of FIG. 3 in due order.

If image-taking and data analysis of the first image sensor are completed, as illustrated in (a) of FIG. 3, the second image sensor takes images of a face of a specific user. Detailed taking-images are illustrated in (5), (6), and (7) of FIG. 3 in due order.

The first image sensor of the plurality of heterogeneous image sensors according to one embodiment of the present invention takes first images located in the periphery of the multimedia device and extracts depth data from the taken first images. As illustrated in (1) of FIG. 3, the first image sensor can be designed in such a manner that a field of each object is displayed at different contrast ratios depending on the distance.

Moreover, the first image sensor can recognize a face of at least one user by using the extracted depth data. In other words, the first image sensor extracts body information (for example, face, hand, foot, joint, etc.) of the user by using the database, etc., as illustrated in (2) of FIG. 3, and acquires location coordinates and distance information of a face of a specific user as illustrated in (3) of FIG. 3. In more detail, the first image sensor is designed to calculate values x, y, and z which are location information on the face of the user, wherein the x means the location on a horizontal axis of the face in the taken first image, the y means the location on a vertical axis of the face in the taken first image, and the z means the distance between the face of the user and the first image sensor.

Also, among the plurality of heterogeneous image sensors according to one embodiment of the present invention, the second image sensor for extracting color images takes second images of the recognized face of the user, and is illustrated in (5) of FIG. 3.

If the first image sensor and the second image sensor illustrated in FIG. 3 are designed to adjoin each other, an error due to the difference in physical location may be disregarded. However, according to another embodiment, the second image sensor is designed to compensate for the coordinate information or distance information acquired by the first image sensor by using the information on the difference in physical location and to take the user by using the compensated coordinate information or distance information.

Also, if the first image sensor and the second image sensor are designed to be arranged horizontally from the ground, the information on the difference in physical location can be set based on a horizontal frame. The second image sensor, as illustrated in (7) of FIG. 3, extracts feature information from the taken second image. The feature information is data corresponding to a specific part (for example, mouse, nose, eye, etc.) for identifying a plurality of users who use the multimedia device. Moreover, the second image sensor may zoom in a zone corresponding to the face of the user based on the coordinate values (the values x, y, and z) obtained through image-taking of the first image sensor. This means a procedure of switching from (5) of FIG. 3 to (6) of FIG. 3.

If image-taking and analysis of the first image sensor and the second image sensor are completely performed, the multimedia device according to one embodiment of the present invention accesses a memory that stores data corresponding to the extracted feature information, and extracts information for identifying a specific user stored in the memory.

If the information for identifying a specific user exists in the memory, the multimedia device provides a service previously set for the specific user. On the other hand, if the information for identifying a specific user does not exist in the memory, the multimedia device is designed to display a guide message for storing the recognized user information in the memory.

As described above, according to one embodiment, the first image sensor is designed to detect user location information or coordinate information on the face of the user while the second image sensor is designed to recognize the face by using the data acquired by the first image sensor.

Moreover, according to another embodiment, the second image sensor is designed in such a manner that it is operated only in case of a specific condition. For example, if the distance information acquired by the operation of the first image sensor between the user and the first image sensor is less than a first reference value, or if a recognition rate on the face of the user, which is acquired by the operation of the first image sensor, is more than a second reference value, the face of the user located in the periphery of the multimedia device is detected and recognized by the first image sensor only.

On the other hand, if the distance information acquired by the operation of the first image sensor exceeds the first reference value, or if the recognition rate on the face of the user, which is acquired by the operation of the first image sensor, is less than the second reference value, the second image sensor is additionally used to recognize the face of the user.

According to another embodiment, the second image sensor is designed to perform zoom-in by using the distance information acquired by the first image sensor in the procedure of recognizing the face of the user and to take the face only by using face coordinate information acquired by the first image sensor.

Accordingly, the different types of heterogeneous image sensors are used as above, it is advantageous in that it enables long-distance face recognition and data processing speed is improved.

Figure 4:
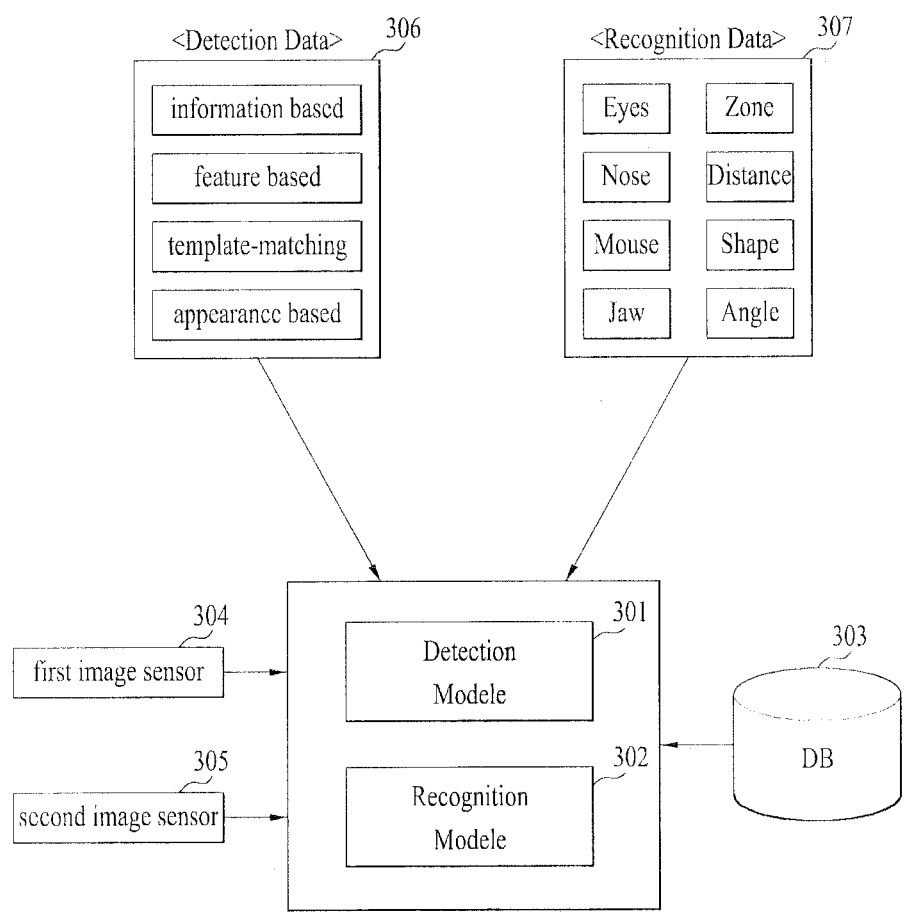
FIG. 4 shows a procedure of using detection and recognition data in connection with a plurality of heterogeneous image sensors.

FIG. 4 shows one embodiment of a procedure of using detection data and recognition data in a plurality of heterogeneous image sensors and a multimedia device. Face detection is performed by a process different from that of face recognition.

The face detection includes a process of detecting a face zone within one image, whereas the face recognition is a process of recognizing whether the detected face corresponds to which specific user. In particular, the procedure of performing face detection by using the first image sensor and the procedure of performing face recognition by using the second image sensor in accordance with one embodiment of the present invention will be described with reference to FIG. 4.

As illustrated in FIG. 4, the multimedia device includes a detection module 301, a recognition module 302, a database (DB) 303, a first image sensor 304, and a second image sensor 305. The multimedia device uses detection data 306 and recognition data 307 if necessary. The detection data 306, for example, may be generated based on knowledge-based detection techniques, feature-based detection techniques, template matching techniques, and appearance-based detection techniques. Also, the recognition data 307, for example, include data for identifying a specific user, such as eyes, nose, mouse, jaw, zone, distance, shape, and angle.

Moreover, the detection module 301 determines the presence of the face of the user by using the image data received from the first image sensor 304. Also, in a procedure of estimating the zone where the face of the user is located, data related to the aforementioned knowledge-based detection techniques, feature-based detection techniques, template matching techniques, and appearance-based detection techniques are used.

The recognition module 302 identifies whether the recognized user is a specific user by using the image data received from the second image sensor 305. At this time, the recognition module 302 compares the received image data with face vector information stored in the DB 303 based on the aforementioned recognition data 307. This will be described in more detail with reference to FIG. 5.

FIG. 5 shows a list of face vectors stored in a database. The face vectors are of users who use a multimedia device, which vectors are stored in the database. The face vectors, for example are a data set of feature information appearing on the faces of the users, and are used to identify each of the specific users.

Figure 6:
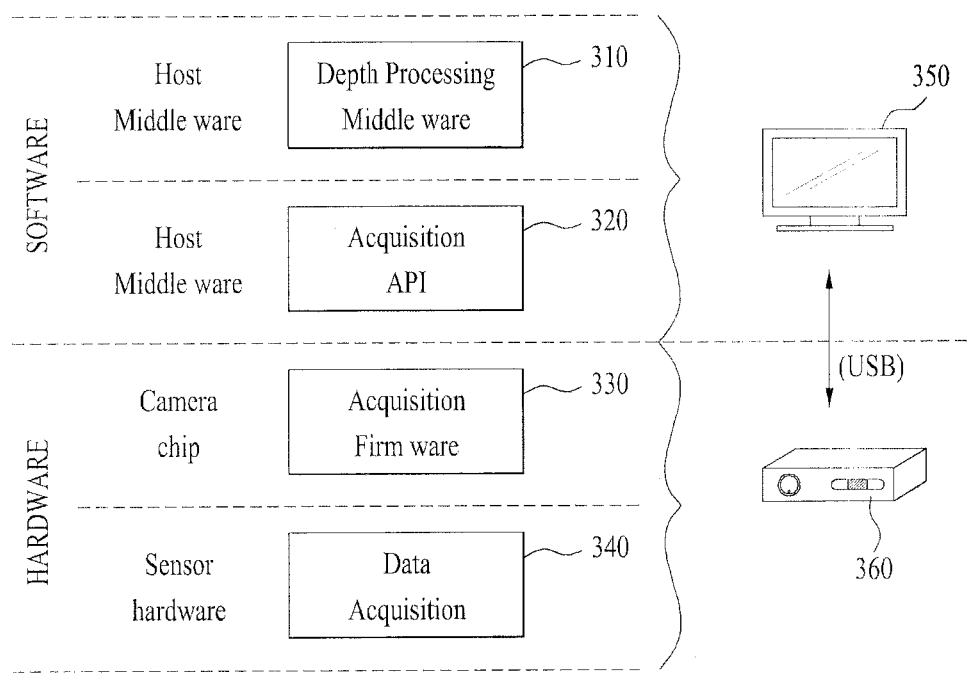
FIG. 6 shows operation of a plurality of heterogeneous image sensors, which interact with a multimedia device in accordance with hardware and software.

FIG. 6 shows an operation of a plurality of heterogeneous image sensors, which interact with a multimedia device according to one embodiment in accordance with a hardware field and a software field.

As illustrated in FIG. 6, the operation of the multimedia device, which is performed through images input by the plurality of heterogeneous image sensors, will be described depending on a hardware field 360 of the image sensor and a software field 350 of the multimedia device that processes the data received from the image sensor. Although the hardware field 360 is illustrated as a separate module in FIG. 6, it may be embedded in the multimedia device that processes the software field 350.

First of all, the hardware field 360 includes a data collection field 340 and a firmware field 330. The data collection field 340 receives original data recognized by the multimedia device from the image sensor, and includes an IR light projector, a depth image sensor, a color image sensor (RGB image sensor), a microphone, and a camera chip.

Also, the firmware field 330 serves to connect the hardware field with the software field. Also, the firmware field 330 may be used as a host application required by a specific application, and performs downsamphng and mirroring.

Accordingly, the data collection field 340 and the firmware field 330 interact with each other. The data collection field 340 and the firmware field 330 can control the hardware field 360 through their interaction. Also, the firmware field can be driven by a camera chip.

Also, the software field 350 includes an application programming interface (API) field 320, and a middleware field 310. The API field 320 can be implemented by the controller of the multimedia device. Also, if a camera module is configured as an external device separately from the multimedia device, the API field can be implemented by a personal computer, a game console, a set-top box, etc. Also, the API field 320 could be a simple API that allows the multimedia device to drive the sensor of the hardware field.

The middleware field 310 is a recognition algorithm field and can include a depth processing middleware. Also, the middleware field can provide an application together with an explicit user control API even if the user inputs gesture through either his (her) hand or his (her) whole body. Also, the middleware field can include an algorithm that performs an operation for searching for the location of the hand of the user, an operation for tracing the location of the user, an operation for extracting skeleton features of the user, and an operation for respectively recognizing the user and background from the input image. The algorithm can be operated by using depth information, color information, IR information, and audio information, which are acquired from the hardware field.

Figure 7:
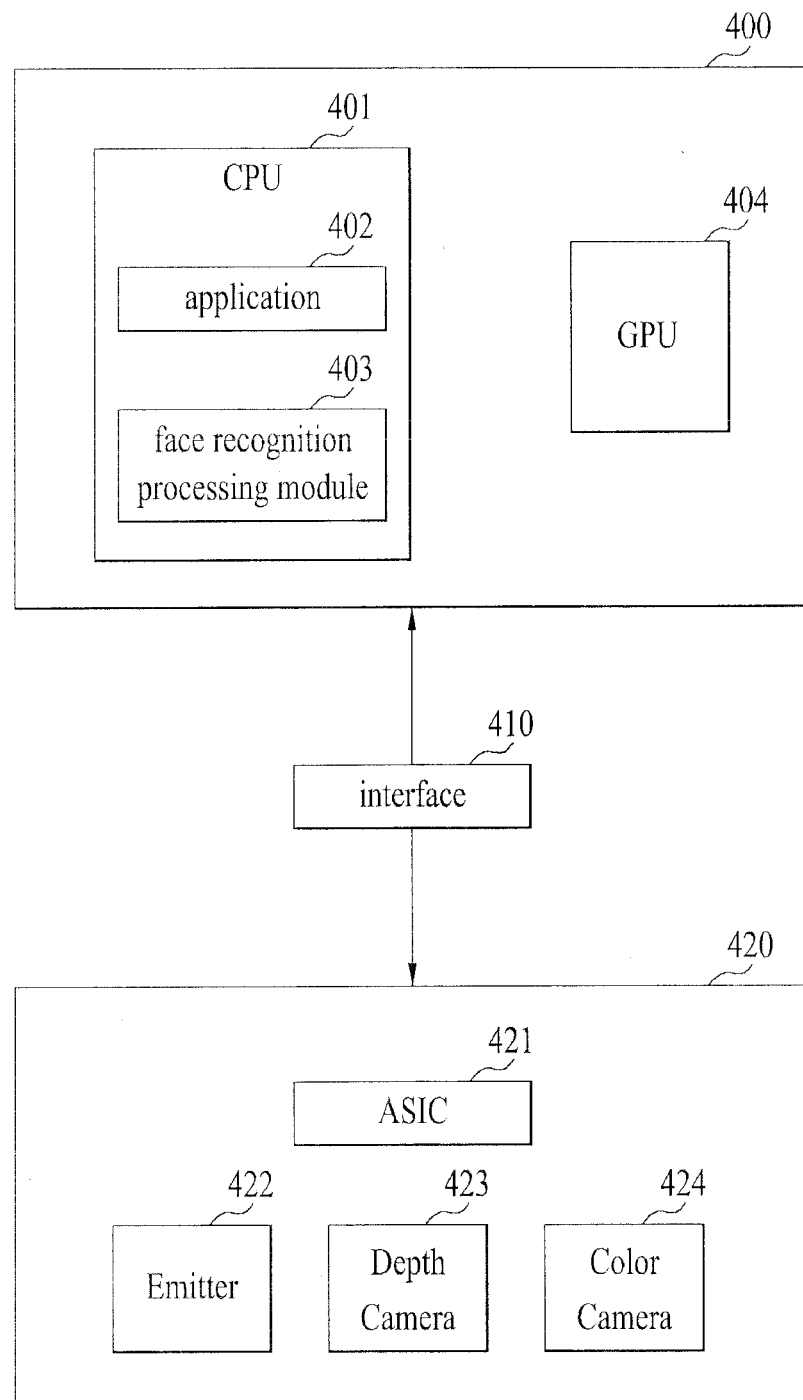
FIG. 7 shows one embodiment which includes a plurality of heterogeneous image sensors and a multimedia device.

FIG. 7 shows one embodiment having a plurality of heterogeneous image sensors and a multimedia device. Although the image sensors and multimedia device are shown to be separate in this embodiment, multiple image sensors/cameras may be designed in such a manner that they are embedded in the multimedia device in other embodiments.

As illustrated in FIG. 7, the multimedia device 400 according to one embodiment of the present invention is designed to include modules such as a central processing unit (CPU) 401 and a graphic processing unit 404, wherein the CPU 401 includes an application 402 and a face recognition processing module 403. In the mean time, a plurality of heterogeneous image sensors 420 are designed to include modules such as an application specific integrated circuit (ASIC) 421, an emitter 422, a first image sensor 423, and a second image sensor 424.

The multimedia device 400 is connected with the plurality of heterogeneous image sensors 420 through a wire or wireless interface 410. For example, a universal serial bus (USB) interface may be used as the wire or wireless interface 410.

The emitter 422 emits light to at least one user located in the periphery of the multimedia device 400. The first image sensor 423 takes a first image by using the emitted light, extracts depth data from the taken first image, and detects a face of the at least one user by using the extracted depth data. Also, the second image sensor 424 takes a second image on the face of the detected user and extracts feature information from the taken second image.

The extracted feature information is transmitted to the face recognition processing module 403 of the multimedia device through the interface 410. Although not illustrated in FIG. 7, the face recognition processing module 403 is designed to include a receiver, a memory, an extractor, and a controller.

The receiver of the face recognition processing module 403 receives feature information transmitted through the plurality of hetero image sensors 420 and the interface 410. Moreover, the memory of the face recognition processing module 403 stores feature information on at least one user and ID corresponding to the feature information.

Accordingly, the extractor of the face recognition processing module 403 extracts the ID corresponding to the received feature information from the memory, and the controller of the face recognition processing module 403 is designed to automatically perform previously set functions corresponding to the ID.

If the face recognition processing module is designed to be performed by the CPU of the multimedia device as illustrated in FIG. 7, it is advantageous in that the design cost of the camera is lowered, and it is also advantageous in view of extensibility such as recognition of various faces and addition of functions.

Figure 8:
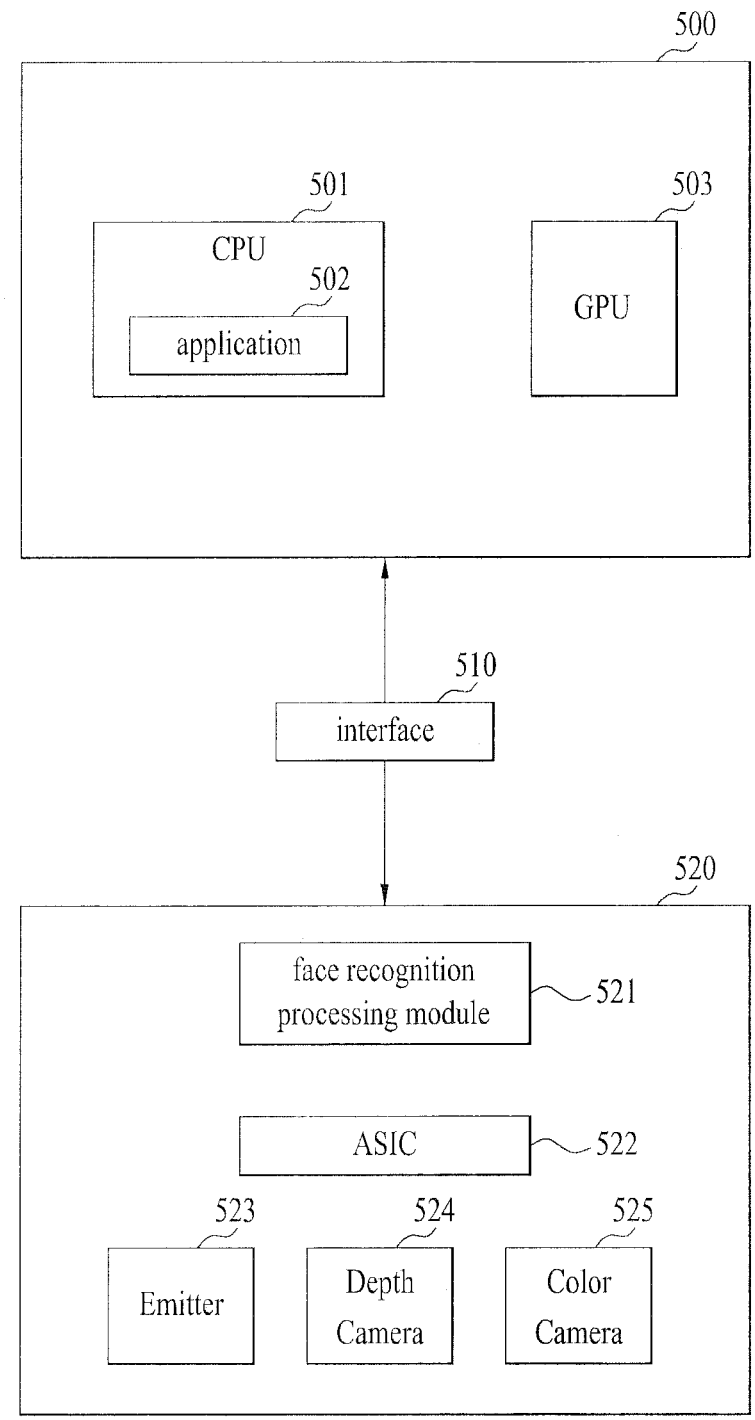
FIG. 8 shows another embodiment which includes a plurality of heterogeneous image sensors and a multimedia device.

FIG. 8 shows another embodiment which includes a plurality of heterogeneous image sensors and a multimedia device. Although the image sensors and the multimedia device are separately illustrated in FIG. 8, multiple image sensors/cameras may be embedded in the multimedia device in other embodiments.

As illustrated in FIG. 8, multimedia device 500 is designed to include modules such as a central processing unit (CPU) 501 and a graphic processing unit 503, wherein the CPU 501 includes an application 502. In the mean time, a plurality of heterogeneous image sensors 520 are designed to include modules such as a face recognition processing module 521, an application specific integrated circuit (ASIC) 522, an emitter 523, a first image sensor 524, and a second image sensor 525.

The multimedia device 500 is connected with the plurality of heterogeneous image sensors 520 through a wire or wireless interface 510. For example, a universal serial bus (USB) interface may be used as the wire or wireless interface 510. It is to be understood that the modules of FIG. 8 are only exemplary and the scope of the present invention should be defined basically by claims.

FIG. 8 is different from FIG. 7 in that the face recognition module 521 is built in the plurality of heterogeneous image sensors 520. As illustrated in FIG. 8, if the face recognition processing module is designed to be performed by the plurality of heterogeneous image sensors 520, various types of cameras can be designed through an independent platform.

Figure 9:
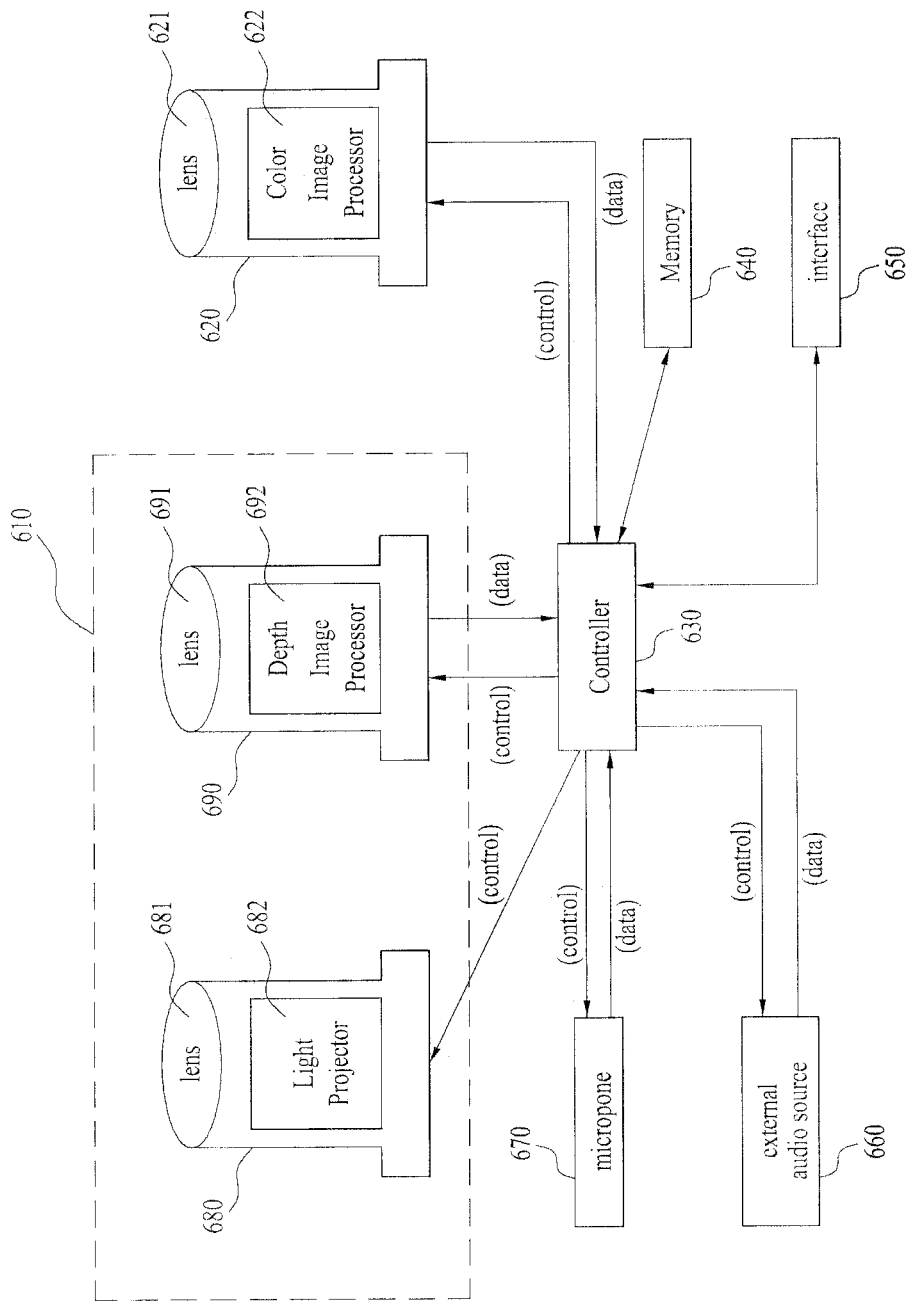
FIG. 9 shows another embodiment which includes a plurality of heterogeneous image sensors.

FIG. 9 shows an embodiment having a plurality of heterogeneous image sensors. The plurality of heterogeneous image sensors include a first image sensor group 610, a second image sensor 620, a controller 630, a memory 640, and an interface 650, and are designed to receive audio data from a microphone 670 and an external audio source 660 under the control of the controller 630.

The memory 640, for example, may be designed as a flash memory. The interface 650 is designed as a USB interface and is connected with an external multimedia device. The first image sensor group 610 includes am emitter 680 and a first image sensor 690. The emitter can be designed as an infra-red (IR) emitter, for example.

Moreover, a light projector 682 of the emitter 680 projects a lens 681 to emit light to at least one user located in the periphery of the multimedia device, under the control of the controller 630.

Also, under the control of the controller 630, the first image sensor 690 takes a first image by using the light received through a lens 691, extracts depth data from the taken first image, and transmits the extracted data to the controller 630. The controller 630 detects a face of the at least one user by using the transmitted depth data, and controls the second image sensor 620.

The second image sensor 620 takes a second image on the face of the detected user applied through a lens 621, under the control of the controller 630. Moreover, the second image sensor 620 transmits feature information extracted from the taken second image to the controller 630.

The controller 630 is designed to transmit the extracted feature information to the multimedia device by using the interface 650. Accordingly, the multimedia device that has received the feature information can quickly identify which user of users stored in the DB is the one corresponding to the taken image.

Figure 10:
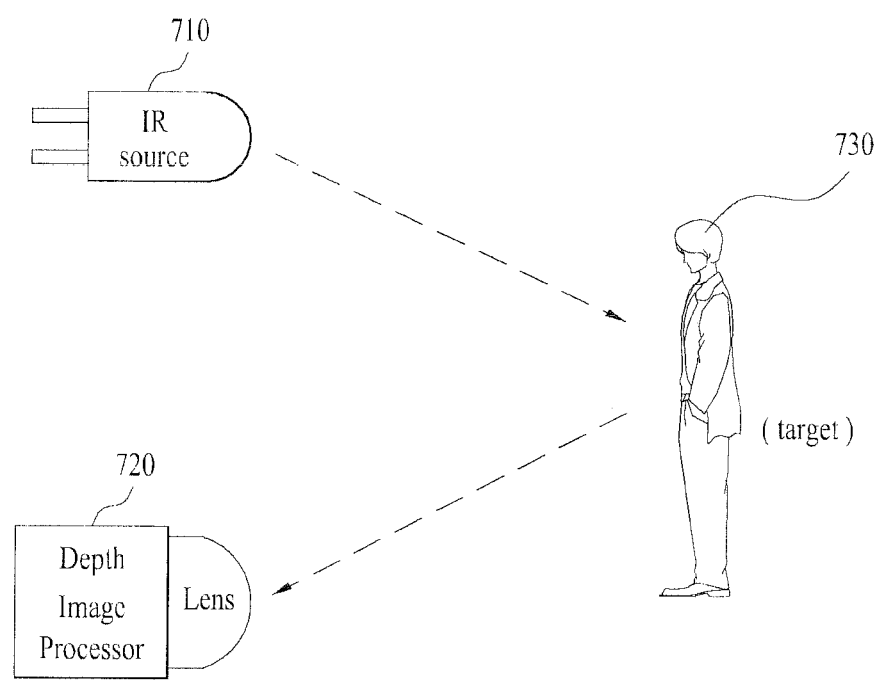
FIG. 10 shows an example of an image sensor.

FIG. 10 shows an example of a first image sensor. In FIG. 10, an IR source 710 may correspond to the emitter 680 of FIG. 9, and a depth image processor 720 may correspond to the first image sensor 690 of FIG. 9. Accordingly, the description of FIG. 9 and FIG. 10 may complementarily be applied to this embodiment. Also, the camera illustrated in FIG. 10 may be designed in accordance with the aforementioned structured light type.

The IR source 710 is designed to continuously project a coded pattern image to a target user 730. The depth image processor 720 estimates the location of the user by using information of an initial pattern image distorted by the target user 730.

Figure 11:
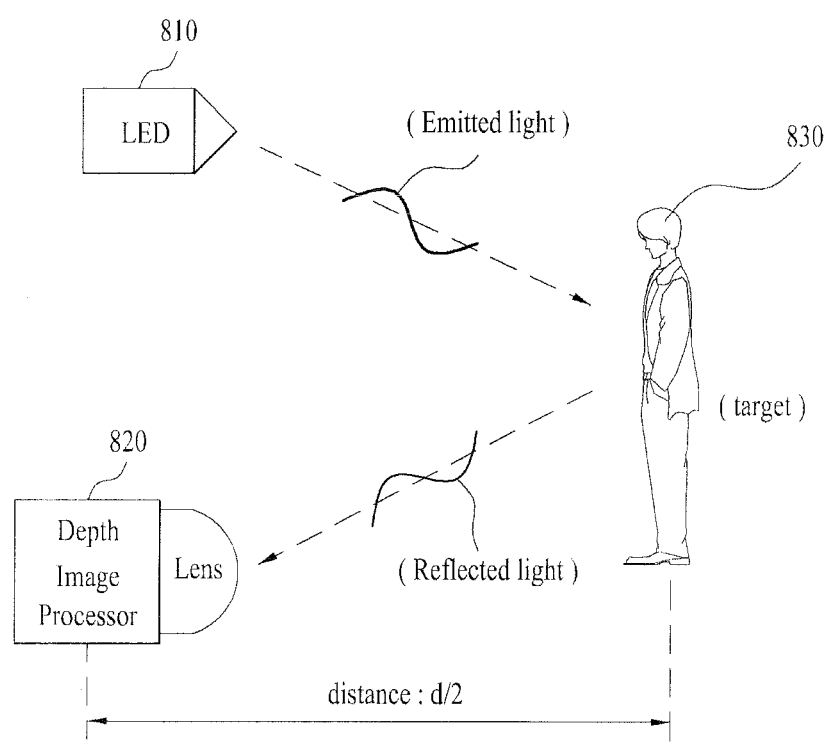
FIG. 11 shows another example of an image sensor.

FIG. 11 shows another example of a first image sensor. In FIG. 11, an LED 810 may correspond to the emitter 680 of FIG. 9, and a depth image processor 820 may correspond to the first image sensor 690 of FIG. 9. Accordingly, the description of FIG. 9 and FIG. 11 may complementarily be applied to this embodiment. Also, the camera illustrated in FIG. 11 may be designed in accordance with the aforementioned TOF type.

The light emitted by the LED 810 is transmitted to a target user 830. The light reflected by the target user 830 is transmitted to the depth image processor 820. The modules illustrated in FIG. 11 calculate the location of the target user 830 by using information on the time difference, unlike FIG. 10. This will be described in more detail with reference to FIG. 12.

Figure 12:
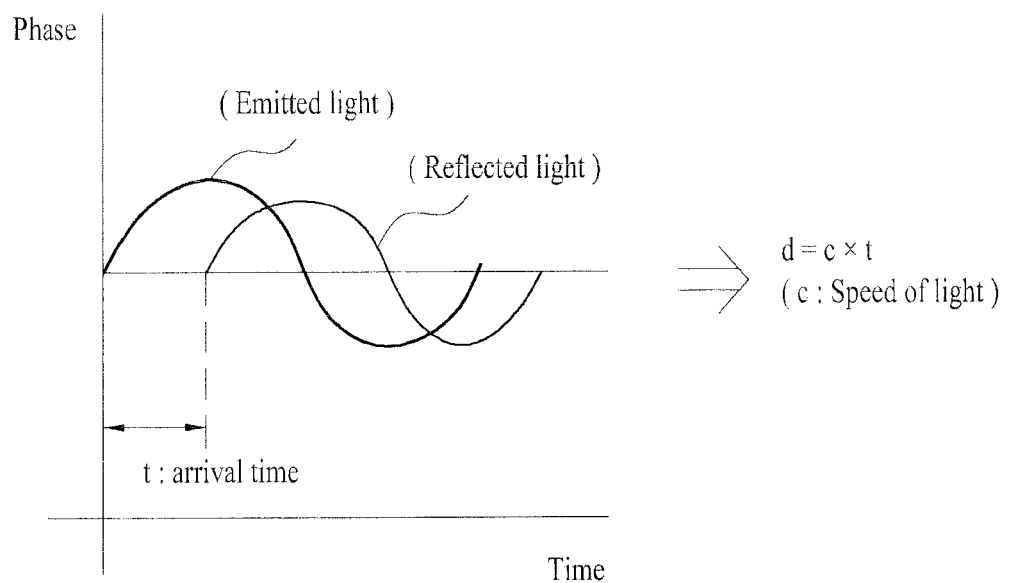
FIG. 12 shows a method for calculating a distance using an image sensor.

FIG. 12 shows a method of calculating a distance using a first image sensor in FIG. 11. As illustrated in a left graph of FIG. 12, a value t which is the arrival time can be obtained through the time difference between the emitted light and the reflected light.

As illustrated in an equation at the right side of FIG. 12, the distance between the LED 810 and the target user 830 and the distance between the target user 830 and the depth image processor 820 are calculated by multiplication of the speed of light and the value t. Accordingly, the distance between the LED 810 or the depth image processor 820 and the target user 830 is estimated as 1/d.

Figure 13:
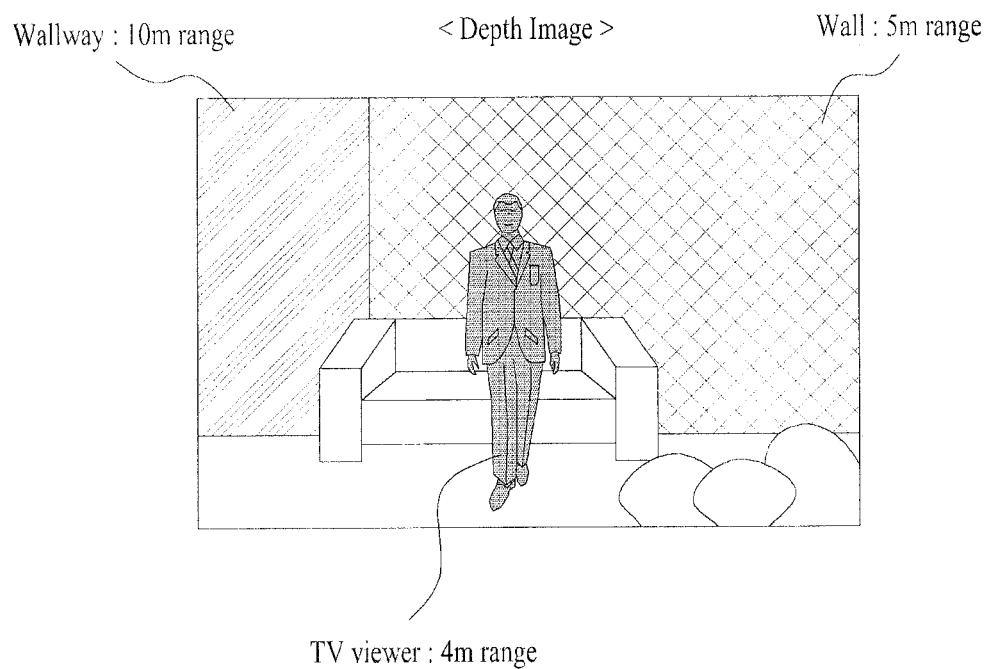
FIG. 13 shows an image taken by an image sensor.

FIG. 13 shows an image taken by a first image sensor of a plurality of heterogeneous image sensors according to one embodiment. As illustrated in FIG. 13, color information such as RGB is not expressed from the image taken by the first image sensor. However, the image taken by the first image sensor is advantageous in that a rough location of an individual object can be identified quickly through differential contrast depending on the distance.

For example, as illustrated in FIG. 13, the farthest hall way is expressed by the darkest contrast, and it is noted that the hall way is away at the distance of 10 m range from the first image sensor. Moreover, a wall located at an intermediate distance level is expressed by contrast of a middle tone, and it is noted that the wall is away at the distance of 5 m range from the first image sensor. A TV viewer located at the relatively closest distance is expressed by contrast of the brightest tone, and it is noted that the TV viewer is away at the distance of 4 m range from the first image sensor.

Figure 14:
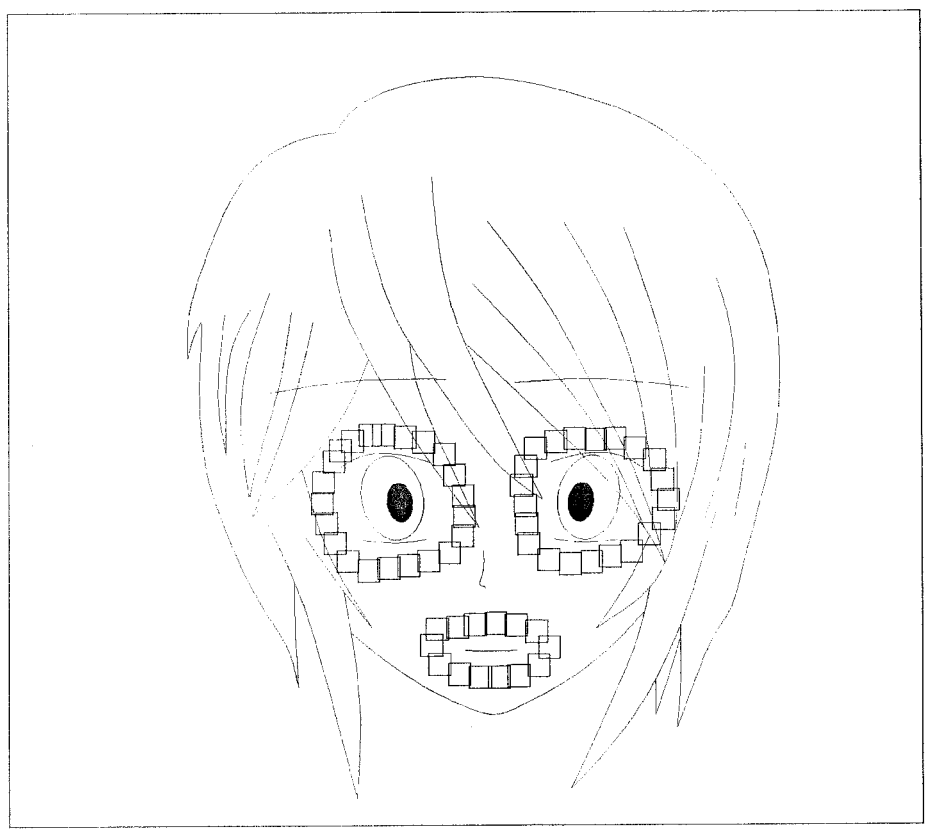
FIG. 14 shows another image sensor.

FIG. 14 shows an image taken by a second image sensor of a plurality of heterogeneous image sensors according to one embodiment. Unlike the first image sensor, since the second image sensor uses bright RGB colors, it is advantageous in that main elements of a face of a user can be identified easily.

In particular, as illustrated in FIG. 14, the second image sensor is designed in such a manner that data in the periphery of eyes, nose, and mouse used to identify a person are processed to be used as feature information for face recognition. Although eyes, nose, and mouse are illustrated in FIG. 14, other elements of the face, such as ears, forehead, hair color, wrinkle, skin color, face shape, and face size, may be used.

Figure 15:
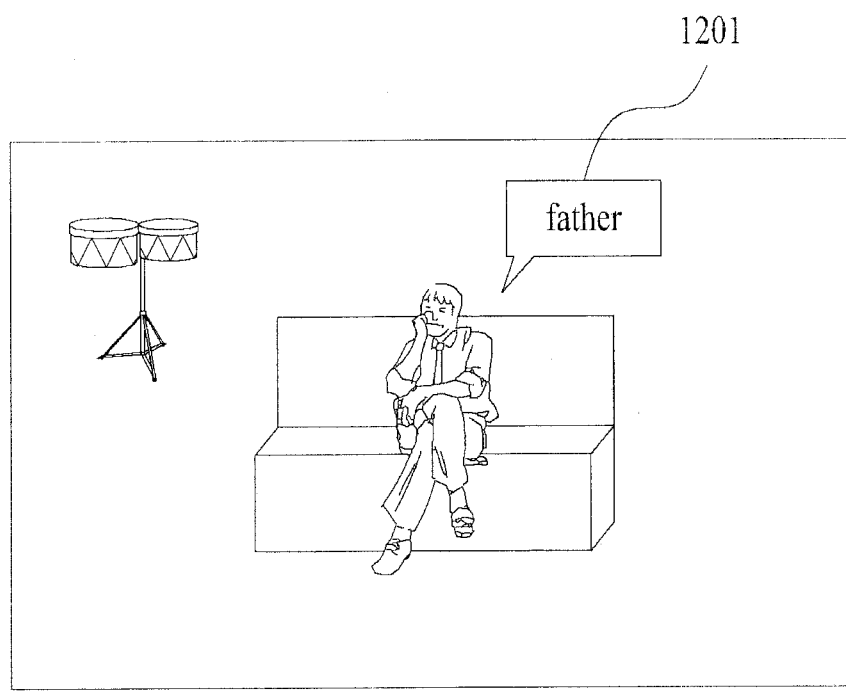
FIG. 15 shows a procedure of recognizing a user through a multimedia device that uses a plurality of heterogeneous image sensors.
Figure 16:
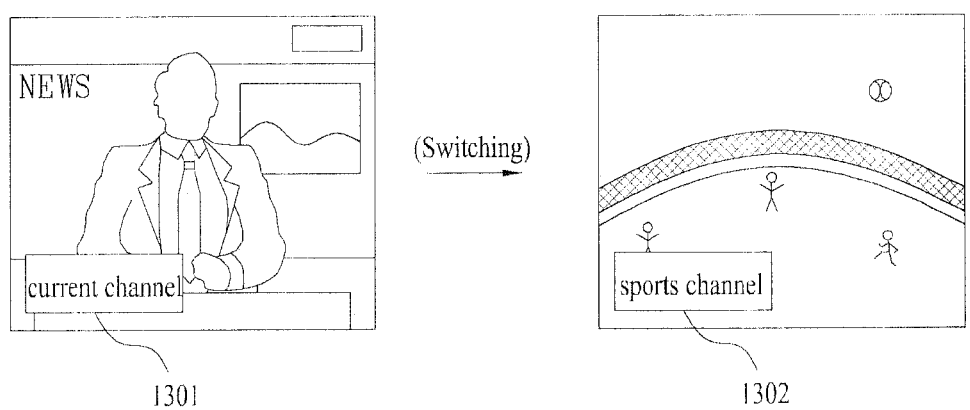
FIG. 16 shows a procedure of performing a function customized to a recognized user.

FIG. 15 shows a procedure of recognizing a user through a multimedia device that uses a plurality of heterogeneous image sensors, and FIG. 16 shows a procedure of performing a function customized to a recognized user in accordance with the recognized result of FIG. 15.

If a specific user located before the multimedia device is recognized by using the plurality of heterogeneous image sensors according to one embodiment of the present invention, corresponding ID 'father' 1201 is displayed in the periphery of the specific user on the screen taken as illustrated in FIG. 15. According to another embodiment, instead of the screen taken as illustrated in FIG. 15, a guide message that the specific user 'father' has been recognized may be displayed while a broadcast screen currently viewed by the specific user is being output.

As illustrated in FIG. 16, in a state that the current channel 1301 is normally displayed, if the specific user 'father' is recognized, the multimedia device may be designed in such a manner that the broadcast screen is converted to a sports channel 1302 preferred by the specific user 'father'. In this case, it is supposed that the information as to that the preference channel of the specific user 'father' is the sports channel is previously stored in the DB of the multimedia device.

Figure 17:
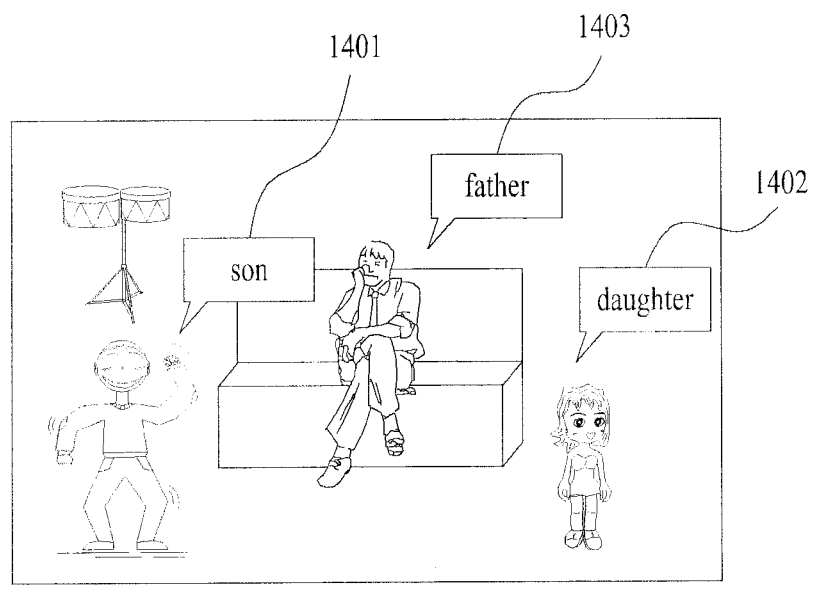
FIG. 17 shows a procedure of recognizing a plurality of users through a multimedia device that uses a plurality of heterogeneous image sensors.
Figure 18:
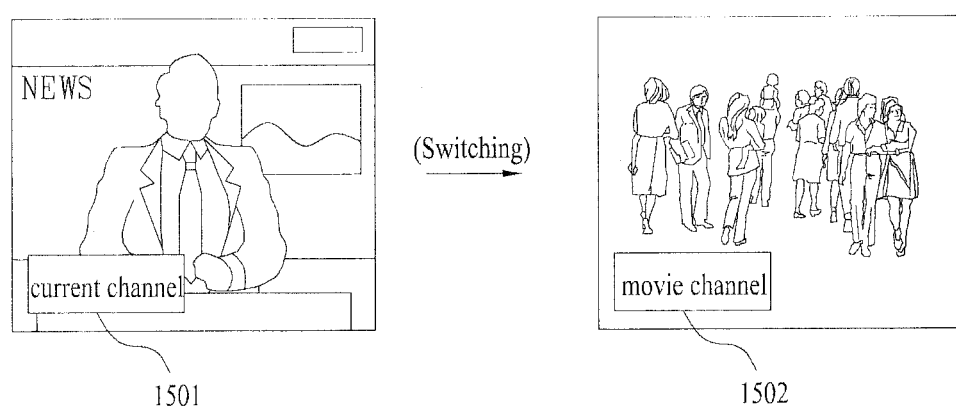
FIG. 18 shows a procedure of performing a function customized to a plurality of recognized users.

FIG. 17 shows a procedure of recognizing a plurality of specific users through a multimedia device that uses a plurality of heterogeneous image sensors according to one embodiment of the present invention. And, FIG. 18 shows a procedure of performing a function customized to a plurality of recognized users. Hereinafter, additional idea for utilizing the aforementioned face recognition result (in particular, the case where multiple users are recognized) will be described with reference to FIG. 17 and FIG. 18.

If three specific users located before the multimedia device are recognized by using the plurality of heterogeneous image sensors according to one embodiment of the present invention, corresponding IDs 'son' 1401, 'daughter' 1402 and 'father' 1403 are displayed in the periphery of the specific users on the screen taken as illustrated in FIG. 17. According to another embodiment, instead of the screen taken as illustrated in FIG. 17, a guide message that the three specific users haven been recognized may be displayed while a broadcast screen currently viewed by the specific users is being output.

Moreover, as illustrated in FIG. 18, in a state that the current channel 1501 is normally displayed, if the plurality of specific users are recognized as described above, the multimedia device may be designed in such a manner that the broadcast screen is converted to a movie channel 1502 preferred by all the specific users. In this case, it is supposed that the information as to that the preference channel of the specific users is the movie channel is previously stored in the DB of the multimedia device.

Figure 19:
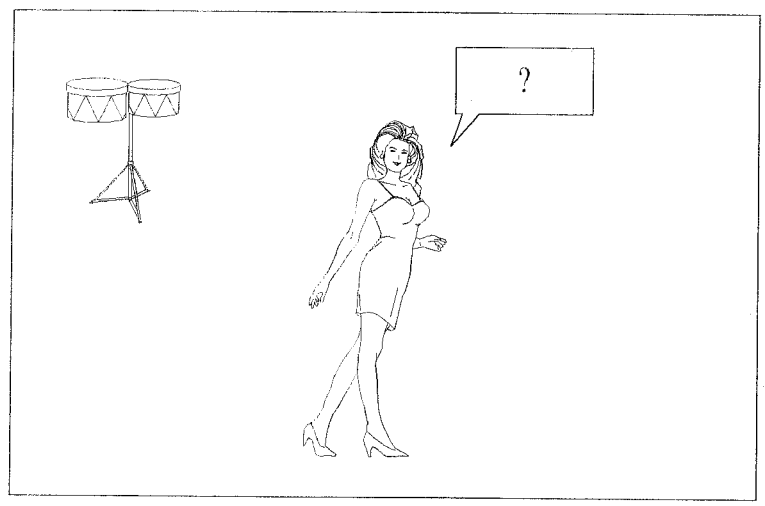
FIG. 19 to FIG. 21 show procedures of registering a new user.
Figure 20:
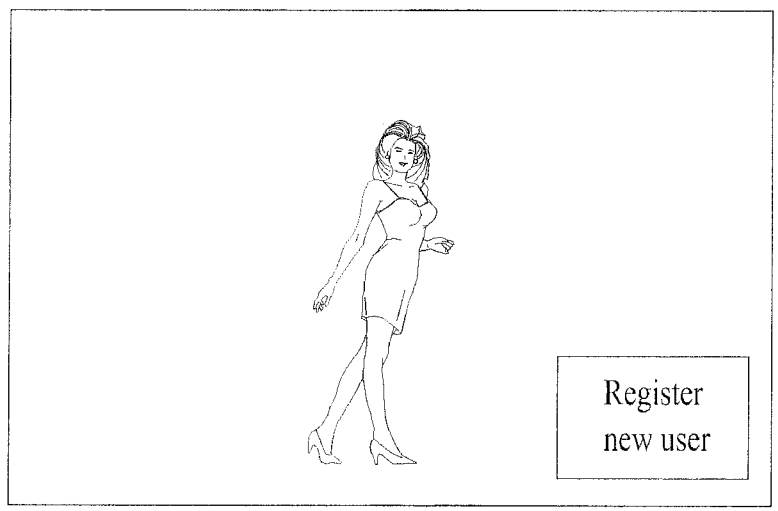
Figure 21:
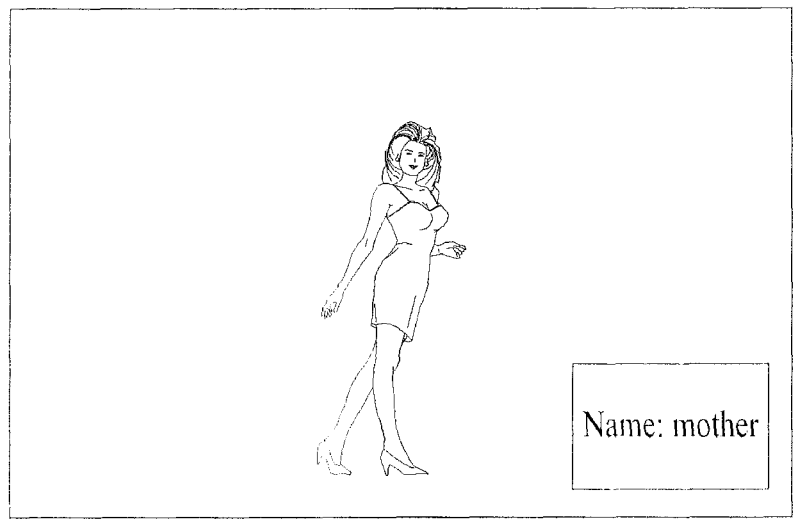

FIG. 19 to FIG. 21 show procedures of registering a new user if a multimedia device that uses a plurality of heterogeneous image sensors. In FIG. 15 to FIG. 18 as described above, it is supposed that user(s) who has recognized the plurality of heterogeneous image sensors according to one embodiment of the present invention is previously stored in the memory or DB. However, in case of a user who has never been made on face recognition, a procedure of registering the user is required.

First of all, if information of corresponding to data recognized by the plurality of heterogeneous image sensors does not exist in the DB of the multimedia device, a message indicating an unknown user is displayed as illustrated in FIG. 19.

Moreover, as illustrated in FIG. 20, a guide message to register information of a user initially taken is displayed, and the taken user can input its identification information as illustrated in FIG. 21. In this case, it is not necessarily required that name should be used as the identification information. The user can optionally use desired information such as occupation, relationships with family, and rank.

Figure 22:
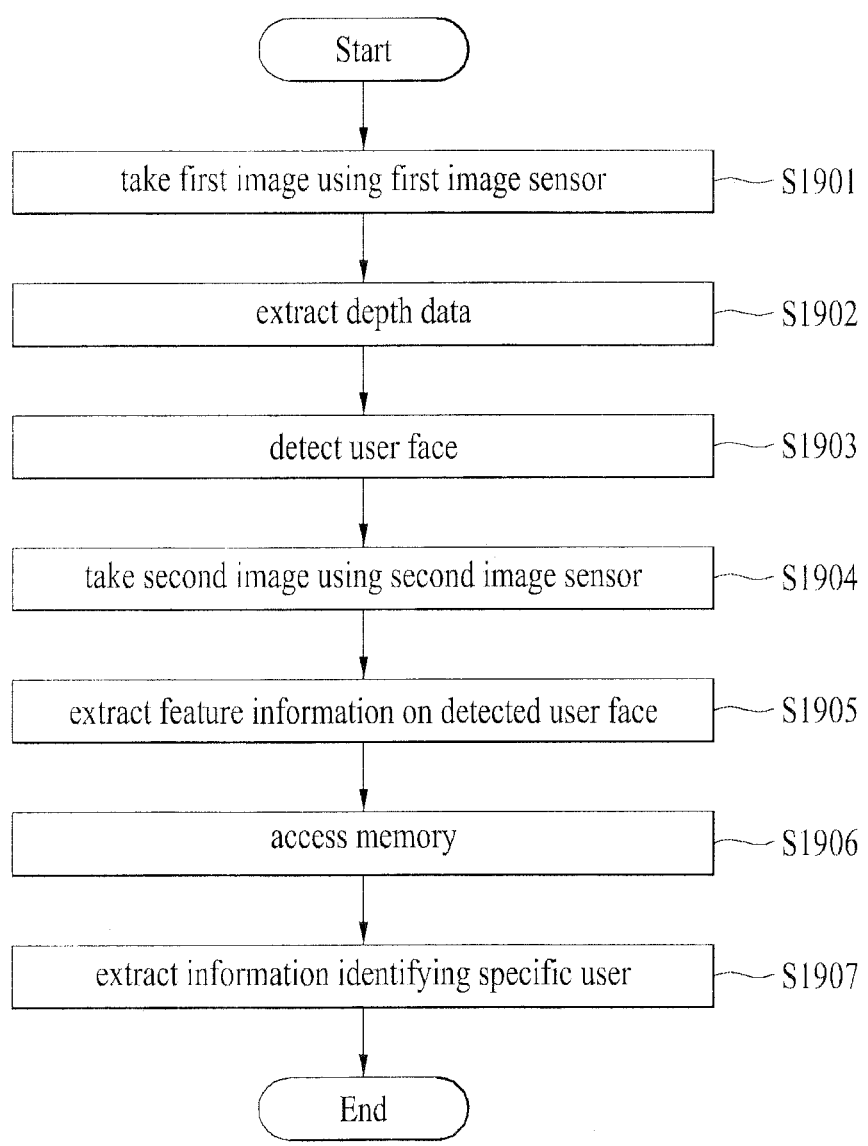
FIG. 22 shows one embodiment of a method of recognizing a user using a plurality of heterogeneous image sensors.

FIG. 22 shows one embodiment of a method of recognizing a user by using a plurality of heterogeneous image sensors. The method of recognizing a user includes taking a first image located in the periphery of the multimedia device by using the first image sensor (S1901). The method includes extracting depth data from the taken first image (S1902). The method includes detecting a face of at least one user by using the extracted depth data (S1903). The method includes taking a second image on the face of the detected user by using the second image sensor (S1904).

The method includes extracting feature information from the taken second image (S1905). The method includes accessing the memory that stores data corresponding to the extracted feature information (S1906). And, the method includes extracting information identifying a specific user stored in the memory (S1907).

Figure 23:
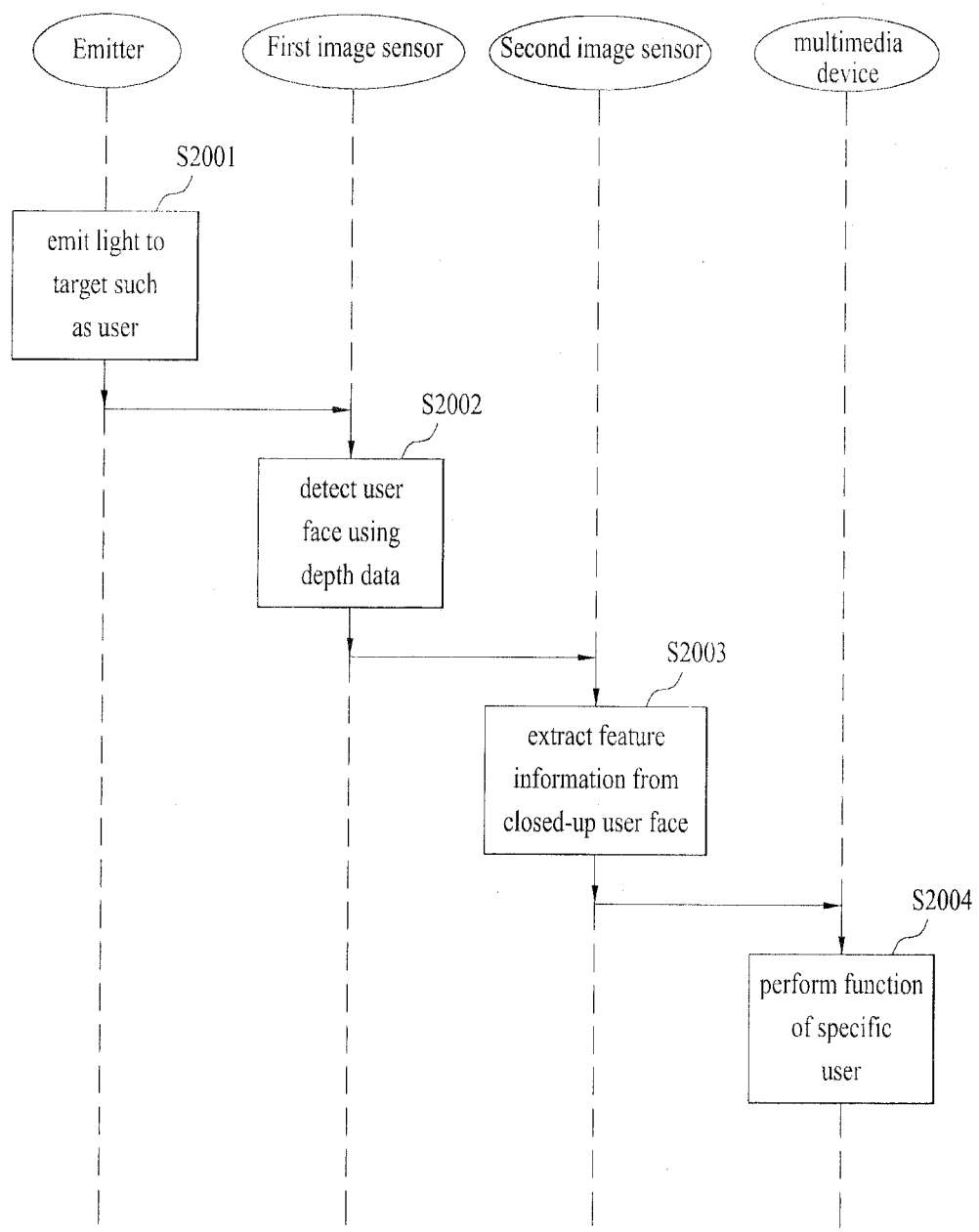
FIG. 23 shows another embodiment of a method of recognizing a user using a plurality of heterogeneous image sensors.

FIG. 23 shows another embodiment of a method of recognizing a user per device using a plurality of heterogeneous image sensors. In this embodiment, the emitter emits the light to at least one user located in the periphery of the multimedia device (S2001). The first image sensor takes a first image by using the emitted light, extracts depth data from the taken first image, and detects a face of the at least one user by using the extracted depth data (S2002).

The second image sensor takes a second image on the face of the detected user, extracts feature information from the taken second image (S2003), and transmits the extracted feature information to the multimedia device.

Accordingly, the multimedia device detects a specific user by using the received feature information and performs a control operation to allow a function of the detected specific user to be performed automatically (S2004).

According to another embodiment, the first image sensor calculates the values x, y and z which are location information on the face of the user, wherein the x means the location on a horizontal axis of the face in the taken first image, the y means the location on a vertical axis of the face in the taken first image, and the z means the distance between the face of the user and the first image sensor.

Moreover, according to another embodiment, the second image sensor takes a zone on the face of the user through zoom-in based on the calculated values x, y and z.

According to another embodiment, the plurality of heterogeneous image sensors that include the emitter, the first image sensor, and the second image sensor are designed to further include a compensation module that compensates for the taken second image based on the physical distance between the location of the first image sensor and the location of the second image sensor.

The emitter corresponds to IR emitter, for example, the first image sensor corresponds to a depth camera, for example, and the second image sensor corresponds to RGB camera, for example.

FIG. 24 shows scenes where a depth image and a color image based on a first pose of a user are taken by a plurality of heterogeneous image sensors. As illustrated in <depth image> of FIG. 24, if the image is taken using the first image sensor, body, skeleton, joint information, etc. of the user in addition to the location of the face of the user can be extracted. Accordingly, it is noted from the joint information, etc. taken in the <depth image> of FIG. 24 that the user currently poses lying. As illustrated in <color image> of FIG. 15, the face of the user who is currently lying is closed-up, and feature information is extracted.

FIG. 25 shows scenes where a depth image and a color image based on a second pose of a user are taken by a plurality of heterogeneous image sensors. As illustrated in <depth image> of FIG. 25, if the image is taken using the first image sensor, body, skeleton, joint information, etc. of the user in addition to the location of the face of the user can be extracted. Accordingly, it is noted from the joint information, etc. taken in the <depth image> of FIG. 25 that the user currently poses standing. As illustrated in <color image> of FIG. 25, the face of the user who is currently standing is closed-up, and feature information is extracted.

FIG. 26 shows scenes where a depth image and a color image based on a third pose of a specific user are taken by using a plurality of heterogeneous image sensors. As illustrated in <depth image> of FIG. 26, if the image is taken using the first image sensor, body, skeleton, joint information, etc. of the user in addition to the location of the face of the user can be extracted. Accordingly, it is noted from the joint information, etc. taken in the <depth image> of FIG. 26 that the user currently poses sitting. As illustrated in <color image> of FIG. 26, the face of the user who is currently sitting down is closed-up, and feature information is extracted.

FIG. 27 shows contents of a database that includes feature information of each user according to pose information generated based on scenes in FIG. 24 to FIG. 26. For example, the pose information could be face rotation information of the taken user. In other words, if the taken face of the user is inclined toward the left side based on the multimedia device, it is expressed by minus (−) information. If the taken face of the user is inclined toward the right side based on the multimedia device, it is expressed by plus (+) information.

As illustrated in FIG. 18, feature information (a, b, c, d) on a face of a father, which corresponds to the pose information (−15, −30, +15, +30) taken and recognized in FIG. 15 to FIG. 17 is stored in the DB. Also, as illustrated in FIG. 18, feature information (e, f, g, h) on a face of a mother, which corresponds to the pose information (−15, −30, +15, +30) taken and recognized in FIG. 24 to FIG. 26 is stored in the DB.

Moreover, as illustrated in FIG. 27, feature information (i, j, k, l) on a face of a son 1, which corresponds to the pose information (−15, −30, +15, +30) taken and recognized in FIG. 24 to FIG. 26 is stored in the DB. As illustrated in FIG. 27, feature information (m, n, o, p) on a face of a son 2, which corresponds to the pose information (−15, −30, +15, +30) taken and recognized in FIG. 24 to FIG. 26 is stored in the DB.

Accordingly, the possibility of error is lowered even though the user or viewers located before the multimedia device change their pose more freely. Also, in order to ensure more improved performance, the multimedia device according to another embodiment can update the users' poses (for example, face rotation angle, etc.) by continuously monitoring them.

Figure 28:
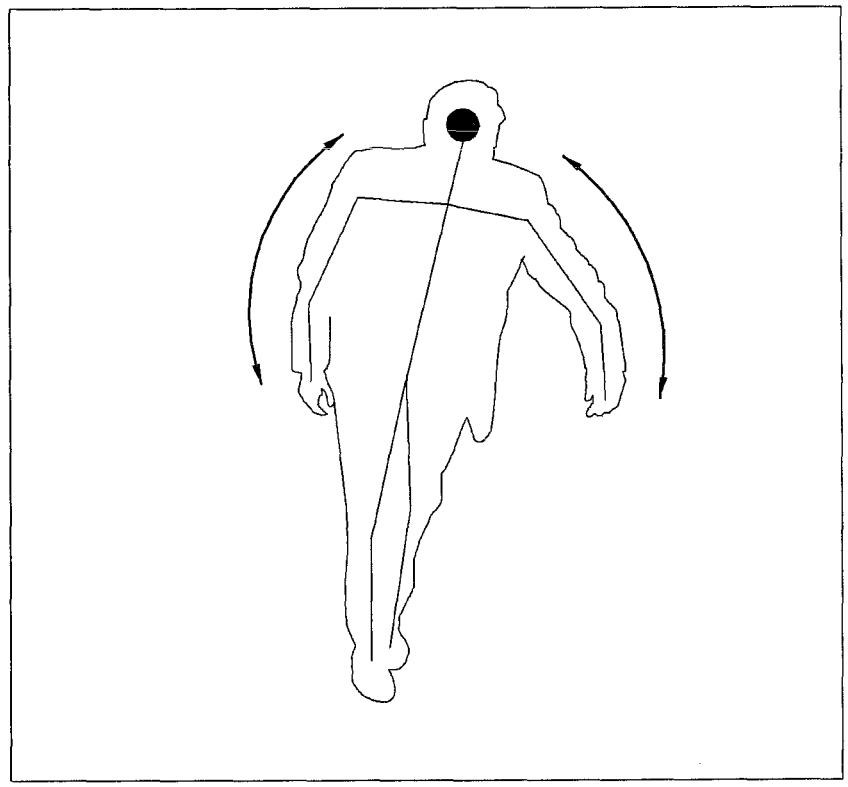
FIG. 28 shows a scene where first body information of a user is taken by a first image sensor.

FIG. 28 shows a scene where first body information of a specific user is taken by using a first image sensor according to one embodiment. As described above, information on the joint of a specific user can be predicted by using the first image sensor. Accordingly, as illustrated in FIG. 19, information on an arm's length of the specific user located before the multimedia device can be detected.

Figure 29:
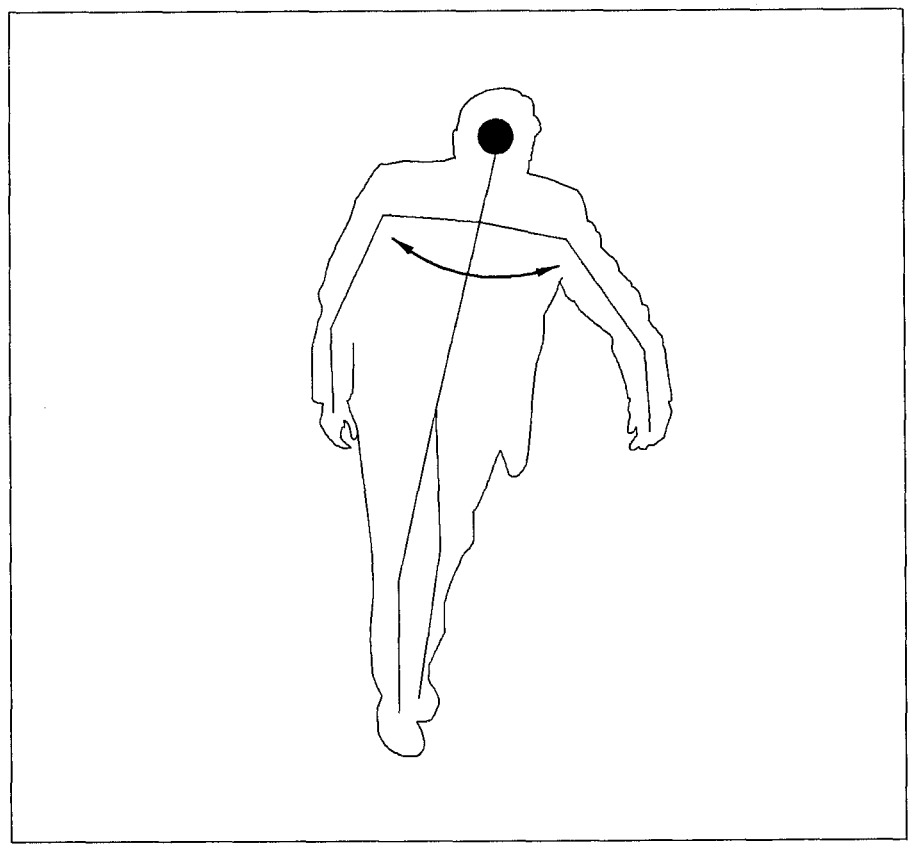
FIG. 29 shows a scene where second body information of a user is taken by a first image sensor.

FIG. 29 shows a scene where second body information of a user is taken by a first image sensor according to one embodiment. As described above, information on the joint of a specific user can be predicted by using the first image sensor. Accordingly, as illustrated in FIG. 29, information on a width of shoulders of the specific user located before the multimedia device can be detected.

Figure 30:
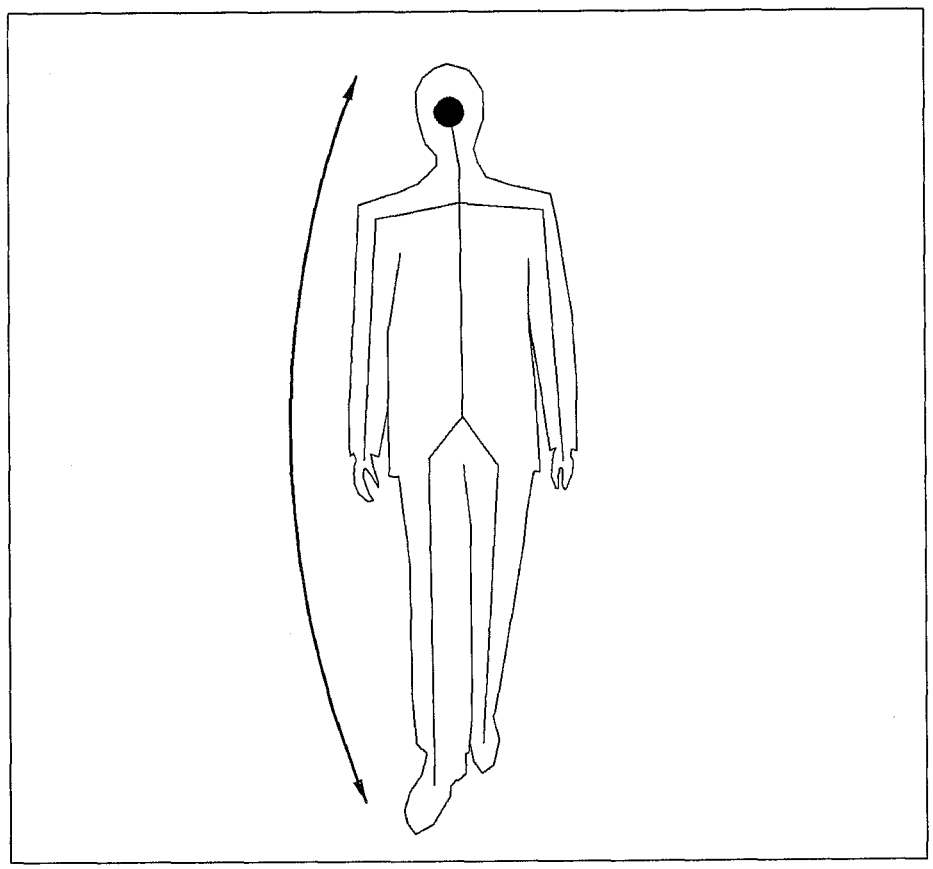
FIG. 30 shows a scene where third body information of a user is taken by a first image sensor.
Figure 31:
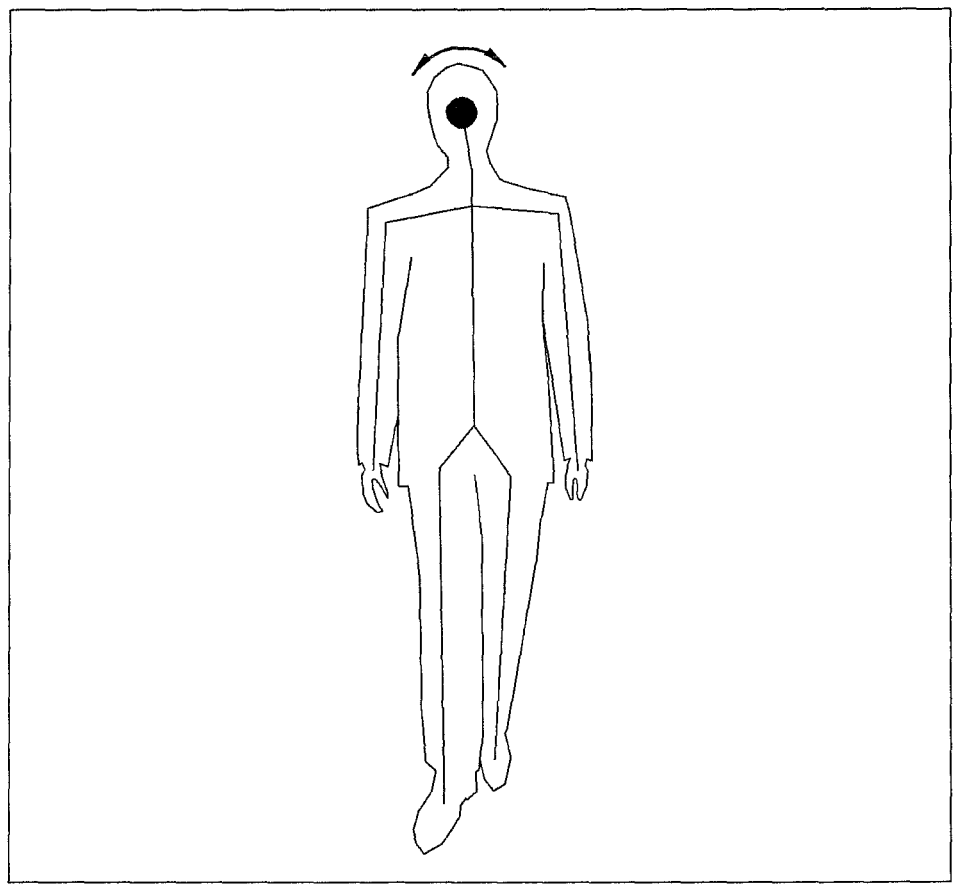
FIG. 31 shows a scene where fourth body information of a user is taken by a first image sensor.

FIG. 30 shows a scene where third body information of a user is taken by a first image sensor, and FIG. 31 shows a scene where fourth body information of a specific user is taken by a first image sensor.

As described above, information on the joint of a specific user can be predicted by using the first image sensor. Accordingly, as illustrated in FIG. 31, information on an face size of the specific user located before the multimedia device can be detected.

FIG. 32 shows contents of a database that includes body information of each user, which is generated based on scenes taken in FIG. 28 to FIG. 31. As illustrated in FIG. 32, body information of each user, which is taken and recognized in FIG. 28 to FIG. 31, is stored in the DB.

In other words, if a specific user cannot be detected or a user currently located before the multimedia device cannot be identified, even using the aforementioned feature information and the aforementioned pose information (for example, face rotation information), the DB illustrated in FIG. 23 can be used. In particular, family members located before the multimedia device may be similar to one another in view of face shape. In this case, if the DB illustrated in FIG. 20 is used, it is advantageous in that user recognition performance can be improved. Also, in order to ensure more improved performance, the multimedia device can update the users' pose information by continuously monitoring them.

In FIG. 28 to FIG. 32, body information (for example, cm unit) of the taken user can be estimated using a scheme that is performed in proportional to the distance between the image sensor and the user. However, according to another embodiment, the body information can be calculated and expressed in a pixel unit. For example, two or more points that express each of face, knees, ankle, wrist, the palm of the hand, pelvis, etc., which are specific body parts of the user, can be detected using the first image sensor.

And, specific body information of the taken user can be estimated by calculating the distance between the detected points. Also, the face size of the user taken using the second image sensor can be estimated by calculating the distance between two eyes of the taken user. Of course, even in case of another embodiment, specific body information calculated by the distance between pixels can be estimated using the scheme that is performed in proportional to the distance between the image sensor and the user.

Figure 33:
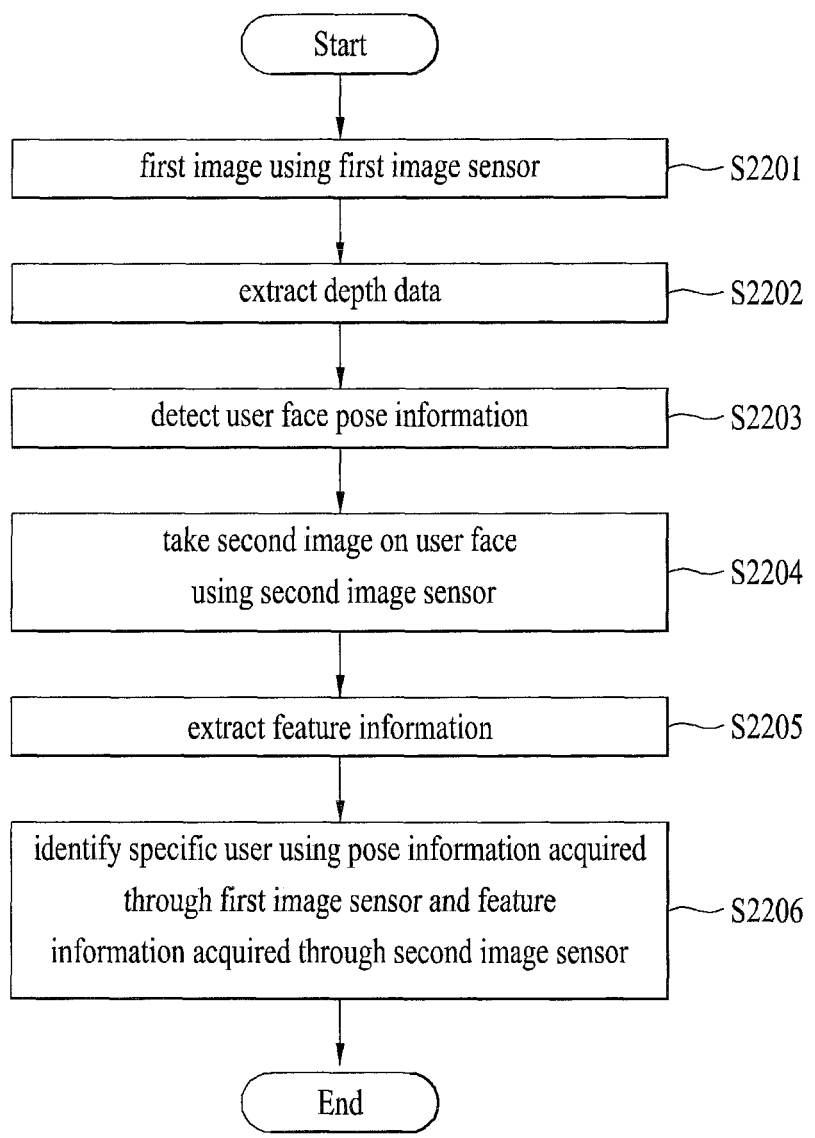
FIG. 33 shows one embodiment of a method of recognizing a user using a plurality of heterogeneous image sensors.

FIG. 33 shows one embodiment of a method of recognizing a user by a plurality of heterogeneous image sensors. Although FIG. 33 to FIG. 36 relate to the description of a method, their description can be analyzed by mutual complementary application with the description of the aforementioned product.

The multimedia device that uses a plurality of heterogeneous image sensors takes a first image located in front of the multimedia device by using the first image sensor (S2201). Moreover, the multimedia device extracts depth data from the taken first image (S2202), and detects a face of at least one user and pose information (for example, face angle) by using the extracted depth data (S2203).

Also, the multimedia device takes a second image on the detected face of the user by using the second image sensor (S2204), and extracts feature information from the taken second image (S2205).

And, the multimedia device extracts information identifying a specific user stored in the memory based on the pose information acquired through the first image sensor and the feature information acquired through the second image sensor (S2206).

Moreover, the second image sensor is designed to take a specific zone through zoom-in by using the depth data (for example, distance information, location information, etc.) acquired through the first image sensor. Accordingly, it is advantageous in that the second image sensor can accurately take the face only of the user located before the multimedia device. Also, the feature information corresponds to facial information that can identify each of taken users.

In particular, since the multimedia device is designed to simultaneously use the feature information on the face and the pose information corresponding to the feature information, it is advantageous in that face recognition performance can be improved and the user is not required to be limited to a specific pose.

Figure 34:
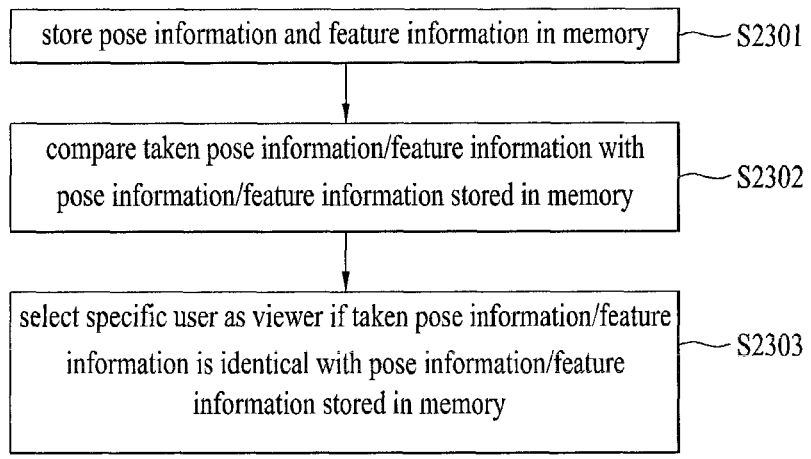
FIG. 34 shows another embodiment of a method of recognizing a user using a plurality of heterogeneous image sensors.

FIG. 34 shows another embodiment of a method of recognizing a user by a plurality of heterogeneous image sensors. In this embodiment, the multimedia device maps pose information of the specific user and feature information corresponding to the pose information and stores them in the memory (S2301). For example, the memory may be the one that includes the database illustrated in FIG. 27.

Moreover, the multimedia device compares the pose information and feature information stored in the memory with pose information acquired through the first image sensor and feature information acquired through the second image sensor (S2302). And, the multimedia device is designed to recognize the specific user as a viewer by using the compared result (S2303).

Figure 35:
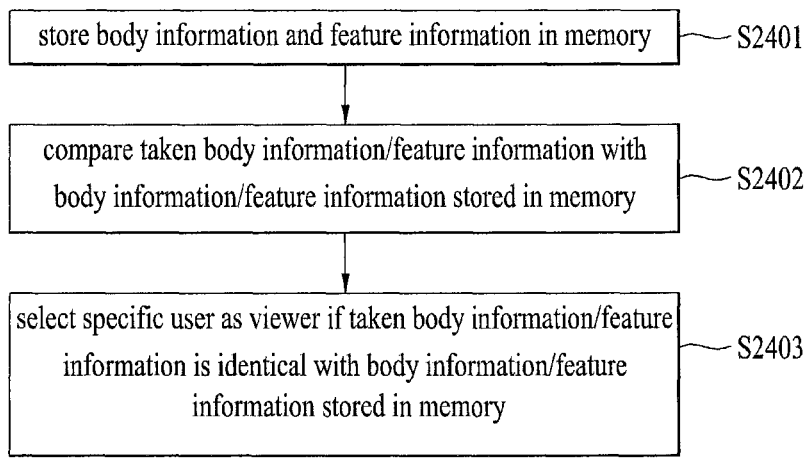
FIG. 35 shows another embodiment of a method of recognizing a user using a plurality of heterogeneous image sensors.

FIG. 35 shows another embodiment of a method of recognizing a user by a plurality of heterogeneous image sensors. In this embodiment, the multimedia device maps body information of the specific user and feature information corresponding to the pose information and stores them in the memory (S2401). For example, the memory may be the one that includes the database illustrated in FIG. 32.

Moreover, the multimedia device compares the body information and feature information stored in the memory with body information acquired through the first image sensor and feature information acquired through the second image sensor (S2402). If the former body information and feature information stored in the memory are identical with the latter body information and feature information, the multimedia device is designed to recognize the specific user as a viewer (S2403).

In particular, according to another embodiment, since the multimedia device is designed to simultaneously use the feature information on the face and the body information, it is advantageous in that face recognition performance can be improved and family members having similar faces can be identified more perfectly.

Figure 36:
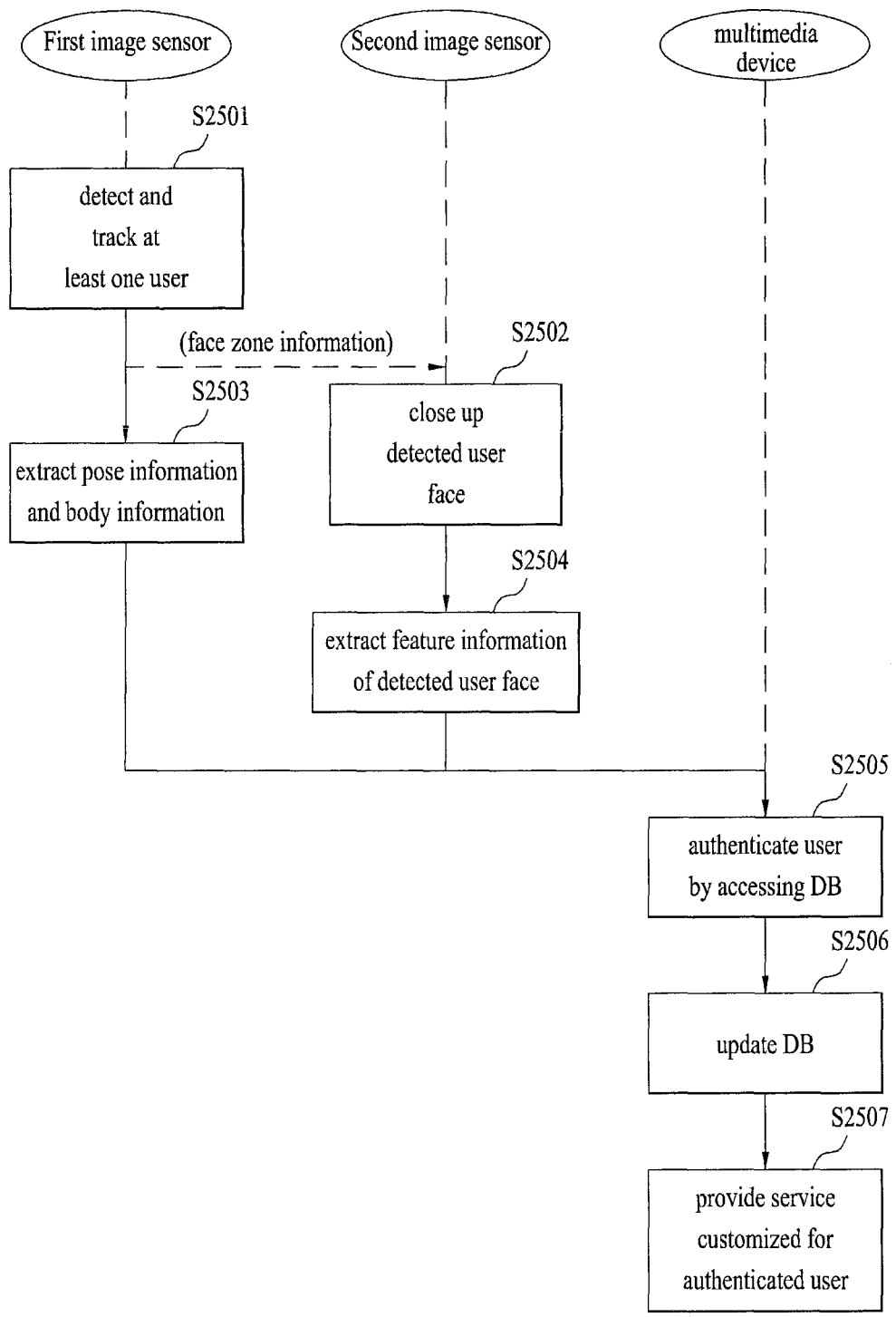
FIG. 36 shows another embodiment of a method of recognizing a user using a plurality of heterogeneous image sensors.

FIG. 36 shows another embodiment of a method of recognizing a user per device by using a plurality of heterogeneous image sensors. In this embodiment, the first image sensor takes a first image by using an emitter that emits the light to at least one user located in front of the multimedia device, and extracts depth data from the taken first image.

Accordingly, detection and tracking of the at least one user are performed (S2501). Also, the first image sensor the face, body information and pose information of the at least one user by using the extracted depth data (S2503). In particular, coordinate information on the location of the face is transmitted to the second image sensor (for example, color camera).

The second image sensor takes a second image by closing up the face zone of the detected user (S2502). Also, the second image sensor extracts feature information from the taken second image (S2504).

The body information and pose information acquired through the first image sensor and feature information acquired through the second image sensor are transmitted to the multimedia device through the interface such as USB.

The multimedia device accesses the DB related to face recognition (for example, FIG. 18 or FIG. 23), and searches and authenticates the user corresponding to the received pose information and body information (S2505). Moreover, the multimedia device updates the authenticated information in the DB (S2506). In this case, the update operation (S2506) may be designed to be operated as background together with the step S2505.

The multimedia device is designed to provide a service customized for the authenticated user (S2507). For example, automatic tuning to a preference channel previously set by the authenticated user may be performed, or preferred applications or contents may be implemented automatically.

Another embodiment may apply to a gaming context. For example, the first and second image sensors of the display device may recognize various gestures or motions made by a user, and then the processor may interpret these motions or gestures to correspond to specific commands or input values. These commands and/or values may then be used as a basis for controlling a function in a game application operating on the display device, and corresponding changes may appear, for example, in the game as various gaming screens are displayed.

Another embodiment may include automatically executing an application or program upon recognition of a specific user. The application may be virtually any application including but not limited to a scheduling or calendar application, a photo album application, e-mail application corresponding to that user's e-mail account, an instant messaging application, automatic execution or access to a social networking, video chat, financial, investment, webcam, or other type of website, automatic access to a predetermined web browser, as well as other Internet or application-based functions.

The aforementioned webcam may be remotely located from the display device or directed connected thereto. If remotely located, the display device may access and display webcam video based on recognition of a specific user. Data may be stored in a database included in or accessed by the display device linking the recognition of each of a plurality of user's to respective applications and/or programs.

Another embodiment involves controlling the movement, appearance, or other action in the screen of a video game or other game application based on poses recognized by the sensors and processor of the multimedia system.

One or more embodiments described herein provide a multimedia device with multiple image sensors of different types and a method for controlling the same, which provide a solution for exactly recognizing users located in the periphery of a multimedia device by using a plurality of heterogeneous image sensors.

One or more embodiments described herein provide a design method that can consider a recognition distance and recognition performance at the same time by solving problems occurring in a recognition procedure of a camera interacting with a multimedia device.

According to one embodiment, a method for controlling a multimedia device that uses a plurality of heterogeneous image sensors comprises the steps of taking a first image located in the periphery of the multimedia device by using a first image sensor, extracting depth data from the taken first image, detecting a face of at least one user by using the extracted depth data, taking a second image on the face of the detected user by using a second image sensor, extracting feature information from the taken second image, accessing a memory, which stores data corresponding to the extracted feature information, and extracting information identifying a specific user stored in the memory.

According to another embodiment, a plurality of heterogeneous image sensors, which recognize at least one user, in accordance with one embodiment of the present invention comprises an emitter emitting light to at least one user located in the periphery of the multimedia device, a first image sensor taking a first image by using the emitted light, extracting depth data from the taken first image, and detecting a face of the at least one user by using the extracted depth data, a second image sensor taking a second image on the face of the detected user and extracting feature information from the taken second image, and an interface transmitting the extracted feature information to the multimedia device.

According to another embodiment, a solution is provided for exactly recognizing users located in the periphery of the multimedia device by using a plurality of heterogeneous image sensors.

According to another embodiment, a design method is provided that can consider a recognition distance and recognition performance at the same time by solving problems occurring in a recognition procedure of a camera interacting with a multimedia device.

One or more embodiments disclosed herein also provide improved face recognition performance, data processing speed, and long distance based on mutual complementary use of a 3D depth camera and a 2D color camera.

The various embodiments described herein may be implemented in program instructions that can be executed by various computer and/or processing architectures, which instructions may be recorded on a computer readable recording medium. The computer readable recording medium can include program instructions, data files, and data structures, alone or in combination. The program instructions recorded in the computer readable recording medium may be designed specially for the embodiments described herein.

Examples of the computer readable recording medium include magnetic media such as hard disks, floppy disks, and magnetic tapes, optical media such as CD-ROM and DVD, magneto-optical media such as floppy disks, and a hardware device such as ROM, RAM, and flash memory, which is configured to store and perform program instructions. Examples of the program instructions include a machine language code made by a compiler and a high-level language code implemented using an interpreter by a computer. The hardware device can be configured as at least one software module to perform the operation of the present invention, and vice versa.

When used herein, the suffixes "module" and "unit" for the elements used in the following description are given or used in common by considering facilitation in writing this disclosure only but fail to have meanings or roles discriminated from each other. The "module" and "unit" can be designed in hardware or software.

A multimedia device described in this specification may correspond to various types of devices that receive and process broadcast data, for example. Moreover, the multimedia device may correspond to a connected TV. The connected TV may be provided with, for example, a wire and wireless communication device in addition to a broadcasting receiving function.

Accordingly, the connected TV may be provided with a more convenient interface such as a manual input unit, a touch screen or a motion recognition remote controller. Also, the connected TV enables e-mailing, web browsing, banking or games by accessing Internet or computer in accordance with the support of wire or wireless Internet function. For these various functions, a standardized general-purpose operating system (OS) can be used.

Accordingly, since the connected TV can freely be provided with or delete various applications on a general-purpose OS kernel, it may perform user-friendly various functions. More detailed examples of the connected TV include a web TV, an Internet TV, an HBBTV, a smart TV, and a DTV. The connected TV may be applied to a smart phone as the case may be.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for managing information in a television having multiple image sensors, comprising:
    acquiring a first image in a first image sensor;
    acquiring a second image in a second image sensor, wherein the second image sensor is physically detached from the first image sensor;
    detecting a person in the first image;
    determining coordinate information of the person in the first image, wherein the coordinate information provides an indication of a first distance from the first image sensor to the person;
    adjusting at least one value corresponding to the person in the first image based on a second distance between the first image sensor and the second image sensor, wherein a physical location of the first image sensor is different from a physical location of the second image sensor, and at least one of the first image sensor or the second image sensor is movable;
    sending a signal to the second image sensor based on the adjusted value;
    extracting a feature of the person from the second image based on the coordinate information and the adjusted value;
    comparing the extracted feature to reference information;
    recognizing the person based on the comparison of the extracted feature to the reference information;
    displaying the recognized person's information while continuing to display a program received via a broadcast network when the person is recognized based on the comparison;
    displaying a guide message for registering a non-recognized person while continuing to display a program received via a broadcast network when the person is not recognized based on the comparison, wherein a registered identification (ID) information is coupled with graphic data acquired by the first image sensor or the second image sensor selectively; and
    storing the registered ID information with the coupled graphic data in a database of the television.

2. The method of claim 1, wherein the feature of the person is at least one body part.

3. The method of claim 1, further comprising:
extracting skeletal information from the second image, and recognizing the person based on the skeletal information.

4. The method of claim 1, further comprising:
detecting and recognizing a face of the person by the first image sensor only, when the first distance acquired by operation of the first image sensor between the first image sensor and the person is less than a first reference value, or when a recognition rate on the face of the person that is acquired by operation of the first image sensor is more than a second reference value; and detecting and recognizing the face of the person by both the first image sensor and the second image sensor, when the first distance acquired by the operation of the first image sensor between the first image sensor and the user exceeds the first reference value, or when the recognition rate on the face of the person that is acquired by operation of the first image sensor is less than the second reference value.

5. The method of claim 1, further comprising:
detecting and recognizing a face of the person by the first image sensor only, when the first distance acquired by operation of the first image sensor between the first image sensor and the person is less than a first reference value; and detecting and recognizing the face of the person by both the first image sensor and the second image sensor, when the first distance acquired by the operation of the first image sensor between the first image sensor and the user exceeds the first reference value.

6. The method of claim 1, further comprising:
detecting and recognizing a face of the person by the first image sensor only when a recognition rate on the face of the person that is acquired by operation of the first image sensor is more than a first reference value; and detecting and recognizing the face of the person by both the first image sensor and the second image sensor, when the recognition rate on the face of the person that is acquired by operation of the first image sensor is less than the first reference value.

* * * * *